(12) United States Patent
Crooks et al.

(10) Patent No.: US 10,604,325 B2
(45) Date of Patent: Mar. 31, 2020

(54) MICROWAVE PACKAGING MATERIAL

(71) Applicant: Graphic Packaging International, Inc., Atlanta, GA (US)

(72) Inventors: Corey Desmond Crooks, Erie, CO (US); Jeffrey T. Sloat, Broomfield, CO (US); Dana Lauren Pearson, Lyons, CO (US)

(73) Assignee: Graphic Packaging International, LLC, Atlanta, GA (US)

( * ) Notice: Subject to any disclaimer, the term of this patent is extended or adjusted under 35 U.S.C. 154(b) by 311 days.

(21) Appl. No.: 15/610,873

(22) Filed: Jun. 1, 2017

(65) Prior Publication Data

US 2017/0349355 A1 Dec. 7, 2017

Related U.S. Application Data

(60) Provisional application No. 62/345,128, filed on Jun. 3, 2016.

(51) Int. Cl.
*H05B 6/64* (2006.01)
*H05B 6/80* (2006.01)
(Continued)

(52) U.S. Cl.
CPC ............ *B65D 81/3461* (2013.01); *B32B 3/26* (2013.01); *B32B 7/12* (2013.01); *B32B 7/14* (2013.01);
(Continued)

(58) Field of Classification Search
CPC .............. B65D 81/3461; B65D 6/6494; B65D 2581/3464; B65D 2581/3472;
(Continued)

(56) References Cited

U.S. PATENT DOCUMENTS

| 3,098,583 A | 7/1963 | Skees |
| 3,439,428 A | 4/1969 | Zelnick |

(Continued)

FOREIGN PATENT DOCUMENTS

| EP | 0 312 333 | 4/1989 |
| EP | 0 421 710 | 10/1991 |

(Continued)

OTHER PUBLICATIONS

International Search Report and Written Opinion for PCT/US2017/035386 dated Aug. 22, 2017.

(Continued)

*Primary Examiner* — Quang T Van

(74) *Attorney, Agent, or Firm* — Womble Bond Dickinson (US) LLP

(57) ABSTRACT

A microwave packaging material for forming a construct for holding a food item. The microwave packaging material can include a film at least partially secured to a substrate by a pattern of adhesive. A plurality of closed cells can extend between the film and the substrate, each closed cell of the plurality of closed cells can be at least partially defined by the pattern of adhesive, and each of the closed cells can be configured to expand during heating to form respective expanded cells. The microwave packaging material further can include a bonded region extending along at least a portion of the microwave packaging material. The film can be secured to the substrate along the bonded region, and the bonded region can be for forming at least one recess among the expanded cells and can be for extending along the food item when the microwave packaging material is heated.

39 Claims, 9 Drawing Sheets

(51) Int. Cl.

| | |
|---|---|
| *B65D 81/34* | (2006.01) |
| *B32B 7/12* | (2006.01) |
| *B32B 7/14* | (2006.01) |
| *B32B 27/36* | (2006.01) |
| *B32B 27/08* | (2006.01) |
| *B32B 27/28* | (2006.01) |
| *B32B 27/34* | (2006.01) |
| *B32B 3/26* | (2006.01) |
| *B32B 27/10* | (2006.01) |
| *B32B 27/32* | (2006.01) |

(52) U.S. Cl.
CPC .............. *B32B 27/08* (2013.01); *B32B 27/10* (2013.01); *B32B 27/281* (2013.01); *B32B 27/285* (2013.01); *B32B 27/286* (2013.01); *B32B 27/32* (2013.01); *B32B 27/34* (2013.01); *B32B 27/36* (2013.01); *B65D 81/3453* (2013.01); *H05B 6/6408* (2013.01); *H05B 6/6494* (2013.01); *B32B 2250/24* (2013.01); *B32B 2250/40* (2013.01); *B32B 2307/732* (2013.01); *B32B 2439/46* (2013.01); *B32B 2439/70* (2013.01); *B32B 2553/00* (2013.01); *B65D 2581/3464* (2013.01); *B65D 2581/3466* (2013.01); *B65D 2581/3472* (2013.01); *B65D 2581/3474* (2013.01); *B65D 2581/3477* (2013.01); *B65D 2581/3478* (2013.01); *B65D 2581/3479* (2013.01); *B65D 2581/3494* (2013.01)

(58) Field of Classification Search
CPC .... B65D 2581/3474; B65D 2581/3478; B65D 2581/3479; B65D 2581/3494; B65D 2581/3466; B32B 7/12; B32B 2553/00; H05B 6/6408
USPC ....... 219/730, 725, 727, 728, 729, 731, 732, 219/757, 759; 426/107, 109, 111, 113, 426/127, 531, 234, 241, 243; 428/35.8, 428/156, 34.3, 461
See application file for complete search history.

(56) References Cited

U.S. PATENT DOCUMENTS

| | | |
|---|---|---|
| 3,595,468 A | 7/1971 | Repko |
| 3,601,252 A | 8/1971 | Sager |
| 3,967,998 A | 7/1976 | Kane |
| 3,973,045 A | 8/1976 | Brandberg et al. |
| 4,013,798 A | 3/1977 | Goltsos |
| 4,132,811 A | 1/1979 | Standing et al. |
| 4,196,331 A | 4/1980 | Leveckis et al. |
| 4,220,684 A | 9/1980 | Olson |
| 4,260,060 A | 4/1981 | Faller |
| 4,267,420 A | 5/1981 | Brastad |
| 4,267,955 A | 5/1981 | Struble |
| 4,268,738 A | 5/1981 | Flautt, Jr. et al. |
| 4,283,427 A | 8/1981 | Winters et al. |
| 4,286,136 A | 8/1981 | Mason, Jr. |
| 4,461,031 A | 7/1984 | Blamer |
| 4,571,337 A | 2/1986 | Cage et al. |
| 4,574,174 A | 3/1986 | McGonigle |
| 4,641,005 A | 2/1987 | Seiferth |
| 4,691,374 A | 9/1987 | Watkins et al. |
| 4,745,249 A | 5/1988 | Daniels |
| 4,775,771 A | 10/1988 | Pawlowski |
| 4,777,053 A | 10/1988 | Tobelmann et al. |
| 4,785,937 A | 11/1988 | Tamezawa et al. |
| 4,786,513 A | 11/1988 | Monforton et al. |
| 4,825,025 A | 4/1989 | Seiferth |
| 4,848,931 A | 7/1989 | Kamada et al. |
| 4,851,632 A | 7/1989 | Kaliski |
| 4,865,921 A | 9/1989 | Hollenberg et al. |
| 4,883,936 A | 11/1989 | Maynard et al. |
| 4,890,439 A | 1/1990 | Smart |
| 4,894,247 A | 1/1990 | Fong |
| 4,911,938 A | 3/1990 | Fisher et al. |
| 4,914,266 A | 4/1990 | Parks et al. |
| 4,916,280 A | 4/1990 | Havette |
| 4,933,193 A | 6/1990 | Fisher |
| 4,936,935 A | 6/1990 | Beckett |
| 4,943,456 A | 7/1990 | Pollart et al. |
| 4,950,859 A | 8/1990 | Anderson |
| 4,962,293 A | 10/1990 | Lackey |
| 4,963,424 A | 10/1990 | Beckett |
| 4,968,865 A | 11/1990 | Seaborne et al. |
| 4,970,358 A | 11/1990 | Brandberg et al. |
| 4,970,360 A | 11/1990 | Pesheck et al. |
| 4,973,810 A | 11/1990 | Brauner |
| 5,003,142 A | 3/1991 | Fuller |
| 5,006,684 A | 4/1991 | Wendt et al. |
| 5,039,364 A | 8/1991 | Beckett |
| 5,041,295 A | 8/1991 | Perry et al. |
| 5,041,325 A | 8/1991 | Larson et al. |
| 5,044,777 A | 9/1991 | Watkins et al. |
| 5,053,594 A | 10/1991 | Thota et al. |
| 5,059,279 A | 10/1991 | Wilson |
| 5,070,173 A | 12/1991 | Yokota et al. |
| 5,077,455 A | 12/1991 | Peleg et al. |
| 5,081,330 A | 1/1992 | Brandberg et al. |
| 5,084,601 A | 1/1992 | Andreas et al. |
| 5,093,364 A | 3/1992 | Richards |
| 5,097,107 A | 3/1992 | Watkins et al. |
| 5,117,078 A | 5/1992 | Beckett |
| 5,124,519 A | 6/1992 | Roy et al. |
| 5,164,562 A | 11/1992 | Huffman et al. |
| 5,177,332 A | 1/1993 | Fong |
| 5,180,894 A | 1/1993 | Quick et al. |
| 5,189,272 A | 2/1993 | McDonald et al. |
| 5,213,902 A | 5/1993 | Beckett |
| 5,217,768 A | 6/1993 | Walters et al. |
| 5,221,419 A | 6/1993 | Beckett |
| 5,230,914 A | 7/1993 | Akervik |
| 5,231,268 A | 7/1993 | Hall et al. |
| 5,239,153 A | 8/1993 | Beckett |
| 5,241,150 A | 8/1993 | Garvey et al. |
| 5,256,846 A | 10/1993 | Walters |
| 5,260,536 A | 11/1993 | Peery |
| 5,260,537 A | 11/1993 | Beckett |
| 5,266,386 A | 11/1993 | Beckett |
| 5,294,763 A | 3/1994 | Chamberlain et al. |
| 5,294,765 A | 3/1994 | Archibald et al. |
| 5,298,708 A | 3/1994 | Babu et al. |
| 5,317,118 A | 5/1994 | Brandberg et al. |
| RE34,683 E | 8/1994 | Maynard et al. |
| 5,338,921 A | 8/1994 | Maheux et al. |
| 5,340,436 A | 8/1994 | Beckett |
| 5,340,632 A | 8/1994 | Chappuis |
| 5,354,973 A | 10/1994 | Beckett |
| 5,357,086 A | 10/1994 | Turpin et al. |
| 5,389,767 A | 2/1995 | Dobry |
| 5,405,663 A | 4/1995 | Archibald et al. |
| 5,410,135 A | 4/1995 | Pollart |
| 5,424,517 A | 6/1995 | Habeger et al. |
| 5,428,209 A | 6/1995 | Babu et al. |
| 5,446,270 A | 8/1995 | Chamberlain et al. |
| 5,484,984 A | 1/1996 | Gics |
| 5,489,766 A | 2/1996 | Walters et al. |
| 5,510,132 A | 4/1996 | Gallo, Jr. |
| 5,514,854 A | 5/1996 | Atsaves |
| 5,519,195 A | 5/1996 | Keefer et al. |
| 5,543,606 A | 8/1996 | Gics |
| 5,565,125 A | 10/1996 | Parks |
| 5,628,921 A | 5/1997 | Beckett |
| 5,630,959 A | 5/1997 | Owens |
| 5,672,407 A | 9/1997 | Beckett |
| 5,688,427 A | 11/1997 | Gallo, Jr. |
| 5,690,853 A | 11/1997 | Jackson et al. |
| 5,753,895 A | 5/1998 | Olson et al. |
| 5,759,422 A | 6/1998 | Schmelzer |
| 5,773,801 A | 6/1998 | Blamer et al. |
| 5,780,824 A | 7/1998 | Matos |

(56) References Cited

U.S. PATENT DOCUMENTS

| | | | |
|---|---|---|---|
| 5,800,724 A | 9/1998 | Habeger |
| 5,916,470 A | 6/1999 | Besser et al. |
| 5,921,681 A | 7/1999 | Money |
| 5,932,680 A | 8/1999 | Heider |
| 5,965,662 A | 10/1999 | Krebs et al. |
| 5,994,685 A | 11/1999 | Jackson et al. |
| 6,005,234 A | 12/1999 | Moseley et al. |
| 6,016,950 A | 1/2000 | Money |
| 6,060,096 A | 5/2000 | Hanson et al. |
| 6,090,706 A | 7/2000 | Telford et al. |
| 6,093,920 A | 7/2000 | Beckwith |
| 6,100,513 A | 8/2000 | Jackson et al. |
| 6,114,679 A | 9/2000 | Lai et al. |
| 6,133,560 A | 10/2000 | Zeng et al. |
| 6,137,098 A | 10/2000 | Moseley et al. |
| 6,150,646 A | 11/2000 | Lai |
| 6,204,492 B1 | 3/2001 | Zeng et al. |
| 6,251,451 B1 | 6/2001 | Zeng |
| 6,303,913 B1 | 10/2001 | Bono et al. |
| 6,303,914 B1 | 10/2001 | Bono et al. |
| 6,335,042 B1 | 1/2002 | Money |
| 6,359,272 B1 | 3/2002 | Sadek et al. |
| 6,414,288 B1 | 7/2002 | Bono et al. |
| 6,414,290 B1 | 7/2002 | Cole et al. |
| 6,431,365 B1 | 8/2002 | Money |
| 6,433,322 B2 | 8/2002 | Zeng |
| 6,436,457 B1 | 8/2002 | Poss |
| 6,455,827 B2 | 9/2002 | Zeng |
| 6,486,455 B1 | 11/2002 | Merabet |
| 6,488,973 B1 | 12/2002 | Wright |
| 6,501,059 B1 | 12/2002 | Mast |
| 6,552,315 B2 | 4/2003 | Zeng |
| 6,677,563 B2 | 1/2004 | Lai |
| 6,683,289 B2 | 1/2004 | Whitmore et al. |
| 6,717,121 B2 | 4/2004 | Zeng |
| 6,744,028 B2 | 6/2004 | Chisholm et al. |
| 6,765,182 B2 | 7/2004 | Cole et al. |
| 6,896,919 B2 | 5/2005 | Wright |
| 7,015,442 B2 | 3/2006 | Tucker, Jr. et al. |
| 7,019,271 B2 | 3/2006 | Wnek et al. |
| 7,038,182 B2 | 5/2006 | Young et al. |
| 7,351,942 B2 | 4/2008 | Wnek et al. |
| 7,365,292 B2 | 4/2008 | Cole et al. |
| 7,541,562 B2 | 6/2009 | Cole et al. |
| 7,812,293 B2 | 10/2010 | Su et al. |
| 7,868,274 B2 | 1/2011 | Bohme et al. |
| 7,923,669 B2 | 4/2011 | Wnek et al. |
| 8,440,275 B2 | 5/2013 | Cole et al. |
| 2002/0064319 A1 | 5/2002 | Tanaka et al. |
| 2003/0017235 A1 | 1/2003 | Wright |
| 2003/0071036 A1 | 4/2003 | Savage et al. |
| 2003/0111463 A1 | 6/2003 | Lai |
| 2003/0206997 A1 | 11/2003 | Winkelman et al. |
| 2004/0022984 A1 | 2/2004 | Abe et al. |
| 2004/0052993 A1 | 3/2004 | Dawes |
| 2004/0130788 A1 | 7/2004 | Minami |
| 2004/0161175 A1 | 8/2004 | Malone et al. |
| 2004/0171767 A1 | 9/2004 | Pohlmann et al. |
| 2004/0173607 A1 | 9/2004 | Blankenbeckler et al. |
| 2005/0079252 A1 | 4/2005 | Kendig et al. |
| 2005/0267245 A1 | 12/2005 | Sandusky et al. |
| 2006/0049190 A1 | 3/2006 | Middleton et al. |
| 2006/0252865 A1 | 11/2006 | Bush et al. |
| 2007/0023426 A1 | 2/2007 | Russell et al. |
| 2007/0251943 A1* | 11/2007 | Wnek ............... B65D 81/3446 219/730 |
| 2008/0081095 A1 | 4/2008 | Cole et al. |
| 2008/0105688 A1 | 5/2008 | Hopkins |
| 2008/0135544 A1 | 6/2008 | Lafferty et al. |
| 2008/0146749 A1 | 6/2008 | Pohlmann et al. |
| 2008/0197128 A1 | 8/2008 | Files et al. |
| 2008/0214339 A1 | 9/2008 | McInnis et al. |
| 2008/0241529 A1 | 10/2008 | Bauer et al. |
| 2008/0280145 A1 | 11/2008 | Paschkowski et al. |
| 2009/0061053 A1 | 3/2009 | Gaylor et al. |
| 2009/0120929 A1 | 5/2009 | Lafferty |
| 2009/0242550 A1 | 10/2009 | Schneider |
| 2009/0277899 A1 | 11/2009 | Cole |
| 2010/0072197 A1 | 3/2010 | Neff et al. |
| 2010/0260900 A1 | 10/2010 | DeVerney et al. |
| 2011/0147377 A1 | 6/2011 | Wnek et al. |
| 2011/0151062 A1* | 6/2011 | Sharma ............ B65D 81/3461 426/95 |
| 2011/0226761 A1 | 9/2011 | Romeo et al. |
| 2011/0233202 A1 | 9/2011 | Robison et al. |

FOREIGN PATENT DOCUMENTS

| | | |
|---|---|---|
| GB | 2 207 589 | 2/1989 |
| JP | 2001-139069 | 5/2001 |
| WO | WO 93/19566 | 9/1933 |
| WO | WO 91/07861 | 5/1991 |
| WO | WO 91/10337 | 7/1991 |
| WO | WO 92/09503 | 6/1992 |
| WO | WO 93/01247 | 1/1993 |
| WO | WO 97/11010 | 3/1997 |
| WO | WO 97/26778 | 7/1997 |
| WO | WO 00/50318 | 8/2000 |
| WO | WO 03/053106 | 6/2003 |
| WO | WO 03/066435 | 8/2003 |
| WO | WO 2005/077783 | 8/2005 |
| WO | WO 2006/113403 | 10/2006 |
| WO | WO 2008/005784 A1 | 1/2008 |
| WO | WO 2009/120739 | 10/2009 |

OTHER PUBLICATIONS

Supplementary European Search Report for EP 17 80 7459 dated Oct. 15, 2019.

* cited by examiner

MICROWAVE PACKAGING MATERIAL

CROSS-REFERENCE TO RELATED APPLICATIONS

This application claims the benefit of U.S. Provisional Patent Application No. 62/345,128, filed Jun. 3, 2016.

INCORPORATION BY REFERENCE

The disclosures of U.S. Pat. No. 7,019,271, which was issued Mar. 28, 2006, U.S. Pat. No. 7,365,292, which was issued Apr. 29, 2008, and U.S. Provisional Patent Application No. 62/345,128, which was filed Jun. 3, 2016, are hereby incorporated by reference for all purposes as if presented herein in their entirety.

BACKGROUND OF THE DISCLOSURE

The present disclosure generally relates to microwave energy interactive materials for forming packaging constructs.

BRIEF SUMMARY OF SOME ASPECTS OF THE DISCLOSURE

In general, one aspect of the disclosure is generally directed to a microwave packaging material for forming a construct for holding a food item. The microwave packaging material can comprise a substrate and a film at least partially secured to the substrate by a pattern of adhesive. A plurality of closed cells can extend between the film and the substrate, each closed cell of the plurality of closed cells can be at least partially defined by the pattern of adhesive, and each of the closed cells can be configured to expand during heating of the microwave packaging material to form respective expanded cells. The microwave packaging material further can comprise a bonded region extending along at least a portion of the microwave packaging material. The film can be secured to the substrate along the bonded region, and the bonded region can be for forming at least one recess among the expanded cells and can be for extending along the food item when the microwave packaging material is heated.

In another aspect, the disclosure is generally directed to a construct for holding a food item. The construct can comprise a microwave packaging material comprising a substrate, a film at least partially secured to the substrate by a pattern of adhesive, and a plurality of closed cells extending between the film and the substrate. Each closed cell of the plurality of closed cells can be at least partially defined by the pattern of adhesive, and each of the closed cells can be configured to expand during heating of the microwave packaging material to form respective expanded cells. The microwave packaging material of the construct further can comprise a bonded region extending along at least a portion of the microwave packaging material. The film can be secured to the substrate along the bonded region, and the bonded region can be for forming at least one recess among the expanded cells and can be for extending along the food item when the microwave packaging material is heated. At least a portion of the construct can extend at least partially around an interior of the construct for holding the food item.

In another aspect, the disclosure is generally directed to a method of forming a microwave packaging material. The method can comprise at least partially securing a film to a substrate with a pattern of adhesive so that a plurality of closed cells are defined by the pattern of adhesive between the film and the substrate. Each of the closed cells can be configured to expand during heating of the microwave packaging material to form respective expanded cells. The method further can comprise forming a bonded region along at least a portion of the microwave packaging material. The forming the bonded region can comprise securing the film to the substrate along the bonded region. The bonded region can be for forming at least one recess among the expanded cells and can be for extending along the food item when the microwave packaging material is heated.

Other aspects, features, and details of the present disclosure can be more completely understood by reference to the following detailed description of exemplary embodiment taken in conjunction with the drawings and from the appended claims.

BRIEF DESCRIPTION OF THE DRAWINGS

Those skilled in the art will appreciate the above stated advantages and other advantages and benefits of various additional embodiments reading the following detailed description of the exemplary embodiments with reference to the below-listed drawing figures. Further, the various features of the drawings discussed below are not necessarily drawn to scale. Dimensions of various features and elements in the drawings may be expanded or reduced to more clearly illustrate the exemplary embodiments of the disclosure.

Corresponding parts are designated by corresponding reference numbers throughout the drawings.

DETAILED DESCRIPTION OF EXEMPLARY EMBODIMENTS

Figure 1:
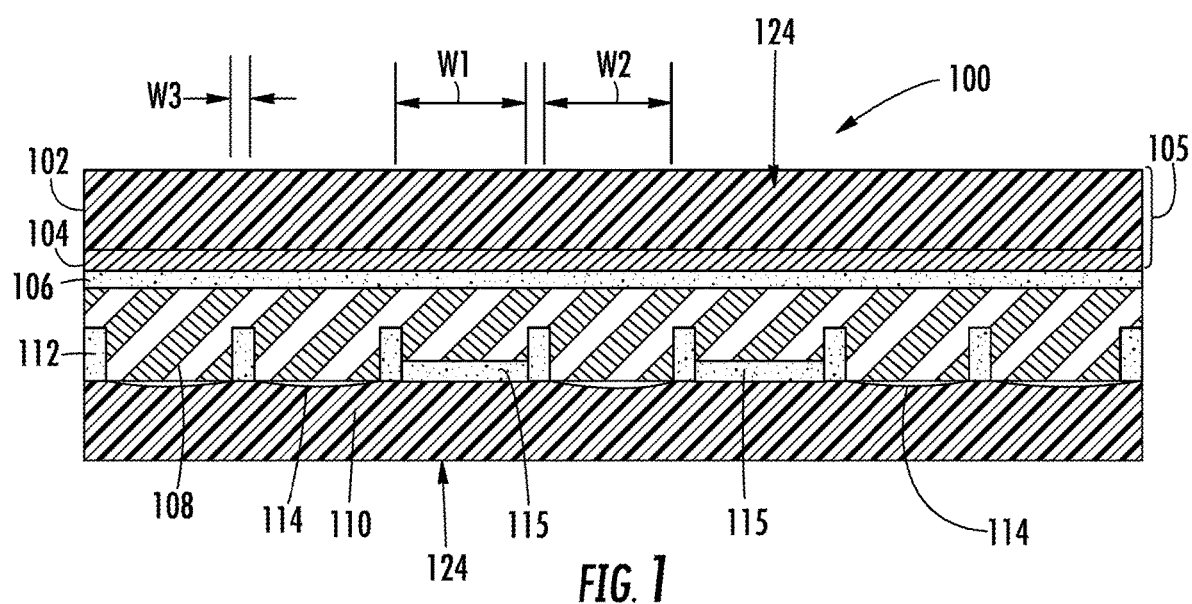
FIG. 1 is a schematic cross-sectional view of a portion of a packaging material according to an embodiment of the present disclosure.

The present disclosure generally relates to a packaging material comprising one or more microwave energy interactive elements. The packaging material can be for forming a construct (e.g., a container, package, sleeve, tray, or other constructs). In some embodiments, a packaging material can include other materials in addition to the microwave energy interactive material (e.g., injection-molded polymer elements). The construct, for example, can be used for holding, storing, freezing, heating, cooking, etc. food products or other suitable products. In one example, a construct can be configured for holding a food product while heating in a microwave oven and/or any other suitable use. The microwave energy interactive elements of the packaging material can include a microwave susceptor element. Other uses and styles of composite constructs are also included in the present disclosure.

The material of the microwave energy interactive element can be, or can include, any type of known microwave energy interactive material, such as a susceptor that is for absorbing microwaves and/or converting microwaves into thermal energy to thereby become hot and to at least radiantly provide heat to food, a microwave energy shielding element that is for reflecting microwaves away from at least a portion of a food item, a microwave energy directing element for directing microwaves toward at least a portion of a food item, and various combinations of these and other features. In accordance with exemplary embodiments of the present disclosure, the material of the microwave energy interactive element can more specifically be a microwave insulating material in contact with the food product for heating, browning, and/or crisping the food product during operation of the microwave oven. It is understood that the food product may be a type of food product that may or may not require browning or crisping during microwave heating without departing from the scope of this disclosure.

According to various aspects of the present disclosure, the material of the microwave energy interactive element of the present disclosure could be any arrangement of layers, such as polymer (e.g., polyester) film layers, susceptor or "microwave interactive" layers, paper layers, continuous and discontinuous adhesive layers, and patterned adhesive layers, that provides an insulating effect. The material of the microwave interactive element may include one or more susceptors, one or more expandable insulating cells, or a combination of susceptors and expandable insulating cells. Examples of materials that may be suitable, alone or in combination, include, but are not limited to, QWIKWAVE® brand susceptor, QWIKWAVE FOCUS® brand susceptor, MICRO-RITE® brand susceptor, MICROFLEX Q® brand susceptor, and QUILTWAVE® brand susceptor, each of which is commercially available from Graphic Packaging International, Inc. The material may be any suitable expandable cell material as desired, and, in some instances, may include any of the materials described herein, any of the materials described in International Publication No. WO 03/066435, published Aug. 14, 2003, which is entirely incorporated by reference herein, or any combination thereof. Alternatively and as should be apparent from the foregoing, as one example the microwave energy interactive element can consist essentially solely of a susceptor.

Alternatively or additionally, any of the blanks, packages, or other constructs of the present disclosure may be coated or laminated with other materials to impart other properties, such as absorbency, repellency, opacity, color, printability, stiffness, or cushioning. For example, absorbent susceptors are described in U.S. Patent Application Publication No. 2006/0049190, published Mar. 9, 2006, which is incorporated herein by reference in its entirety. Additionally, the blanks or other constructs may include graphics or indicia printed thereon.

The microwave energy interactive element can include other materials than described herein and may be otherwise arranged, configured, and/or designed without departing from the scope of the disclosure. Further, multiple layers of microwave energy interactive element can be used in the packaging material. Alternatively, the microwave energy interactive element can be omitted without departing from the scope of the disclosure.

Figure 2:
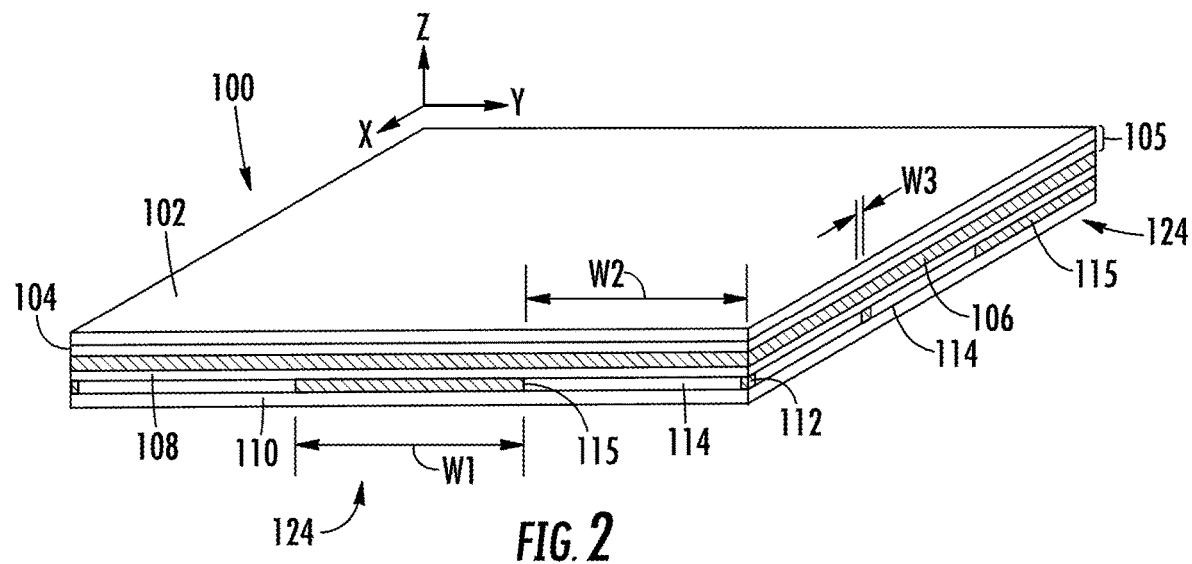
FIGS. 2 and 3 are schematic perspective views of a portion of the packaging material of FIG. 1.
Figure 3:
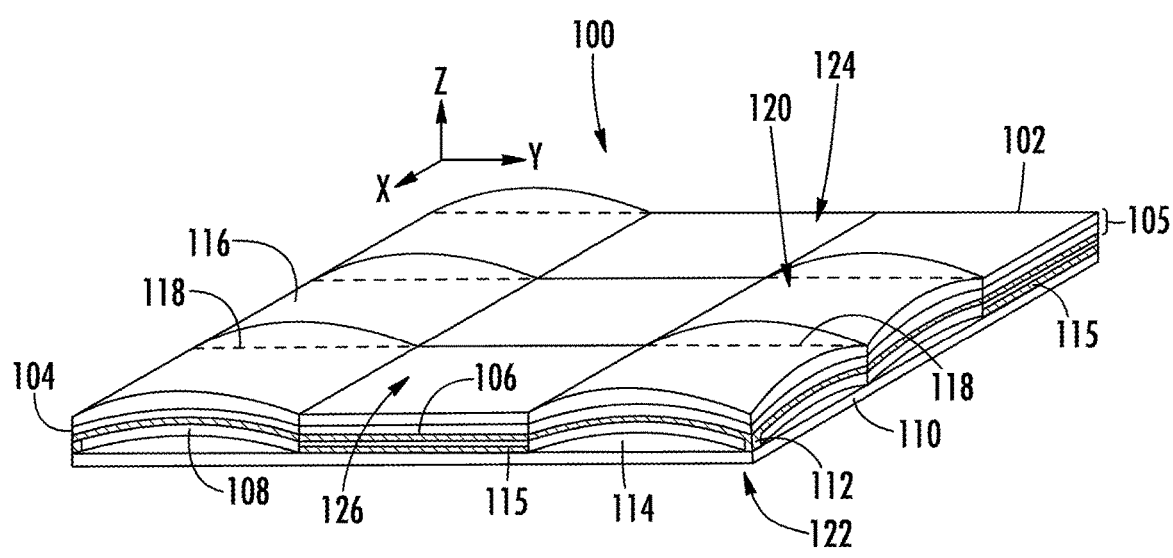

A portion of an insulating microwave packaging material 100 according to the present disclosure for use in consumer food product packaging is schematically depicted in FIGS. 1, 2, and 3. In the illustrated embodiment, the microwave packaging material 100 is the combination of a plurality of material layers. A susceptor film 105, which can include the product of the deposition of a thin layer of microwave interactive material 104 on a first polymer film 102, is bonded, for example, by lamination with an adhesive 106 to a dimensionally stable substrate 108. The dimensionally stable substrate 108 then can be bonded to a second polymer film 110. In an alternative embodiment, an additional substrate layer can be adhered, for example with adhesive, to the first polymer film 102 opposite the microwave interactive material 104. In addition, the polymer films 102, 110 could be other suitable films without departing from the disclosure.

In the illustrated embodiment, the bond between the dimensionally stable substrate 108 and the second plastic film 110 is in the form of a pattern, for example, a pattern of adhesive 112, that creates a plurality of closed cells 114 extending between the substrate 108 and the second polymer film 110. In one embodiment, vapor migration can be resisted between the closed cells 114 since the closed cells are defined and bounded by the first plastic film 102, the adhesive 106, the adhesive pattern 112, and the second plastic film layer 110, each of which can be resistant to vapor migration. To maximize the sealing of the cells, it may be desirable to achieve an adhesive bond directly between the susceptor 105 and the second plastic film 110, for example, by choosing an adhesive for the adhesive pattern 112 that may penetrate the dimensionally stable substrate 108 and contact the first adhesive layer 106 on the susceptor film 105.

As shown in FIGS. 1 and 2, the microwave packaging material 100 can include an adhesive 115 along with the closed cells 114 and the adhesive pattern 112. In the illustrated embodiment, the adhesive 115 can cooperate with the pattern of adhesive 112 to secure the substrate 108 and the second plastic film 110 together (e.g., the adhesive 115 can be generally coplanar with the adhesive pattern 112). Accordingly, the adhesive 115 can form a bonded region 124 of the microwave packaging material 100 among the closed cells 114, wherein the bonded region 124 generally does not expand with the cells 114 during the heating of the microwave packaging material. In one embodiment, the adhesive 115 can be an expanded portion of the adhesive pattern 112 or can be otherwise incorporated into the adhesive pattern 112. Alternatively, the adhesive 115 could be a different adhesive than what is used in the adhesive pattern 112 and/or could be applied separately from the adhesive pattern (e.g., before or after the adhesive pattern 112). In another embodiment, the substrate 108 and the second polymer film 110 could be otherwise secured together to form the bonded region 124 (e.g., by welding or other suitable methods).

While the microwave packaging material 100 is shown schematically and generally not to scale in the figures, the bonded region 124 can have a width W1 (e.g., a cross-sectional width of the bonded region 124 as shown in FIGS. 1 and 2) that is similar to the width W2 of the cells 114 (e.g., a cross-sectional width of the cells 114 as shown in FIGS. 1 and 2) and is significantly larger than the width W3 of the individual portions of the adhesive pattern 112 as shown in FIGS. 1 and 2 (e.g., a cross-sectional width of each portion or line of the adhesive pattern 112 as shown in FIGS. 1 and 2). In one embodiment, the cross-sectional widths W1, W2, W3 are considered to be the characteristic widths of the respective bonded region 124, the closed cells 114, and the adhesive of the adhesive pattern 112, respectively. In one example, the adhesive pattern 112 generally can form a grid of lines (having a smaller—e.g., significantly smaller—characteristic width W3 relative to the cells 114) in the microwave packaging material 100 while the characteristic width W1 of the bonded region 124 in the cross-section of the microwave packaging material 100 can be approximately a half of the characteristic width W2 of the cells 114 to one or more times the characteristic width W2 of the cells 114. The microwave packaging material 100 could be otherwise shaped, arranged, and/or configured without departing from the disclosure. For example, the bonded region 124 could be any suitable width and/or could be otherwise disposed in the microwave packaging material 100.

The microwave packaging material 100 presents as a substantially flat, multi-layered sheet as schematically shown in the schematic perspective cross-section of FIG. 2. Such a flat configuration is desirable for use in packaging because it adds little bulk to the finished package. Upon heating in a microwave oven, with a minor constraints applied periodically about the perimeter of the sheet, several changes occur in the insulating microwave packaging 100 that provide several novel benefits. FIG. 3 depicts, in schematic perspective cross-section, the microwave packaging material 100 of FIGS. 1 and 2 subjected to microwave energy in a microwave oven. As the susceptor film 105 heats upon impingement by microwave energy, water vapor and other gases normally held in the paper substrate 108, and any air trapped in the thin space between the second plastic film 110 and the paper substrate 108 in the closed cells 114, expand due to the heat generated. The expansion of water vapor and air in the closed cells 114 applies pressure on the susceptor film 105 and the paper substrate 108 on one side, and the second plastic film 110 on the other side of the closed cells 114. However, each side of the microwave packaging material 100 forming the closed cells 114 reacts simultaneously to the heating and vapor expansion in a unique way. The cells 114 expand to form a quilted top surface 120 of pillows 116 separated by channels 118 in the susceptor film 105 and paper substrate 108 lamination, which lofts above a bottom surface 122 formed by the second plastic film 110. Thus, an originally compact packaging material is transformed into a bulk insulating material, without any further requirements for consumer preparation of the food product package before cooking.

As shown in FIG. 3, a channel or recess 126 is formed where the adhesive 115 of the bonded region 124 prevents the formation of the pillows 116 (e.g., where the bonded region 124 extends in the microwave packaging material 100 in place of the cells 114). In one embodiment, the adhesive 115 can bond the second polymer film 110 to the substrate 108 across substantially the entire bonded region 124 to form the recess 126. Accordingly, the bonded region 124 can remain generally flat (e.g., without expanding cells) to form a generally recessed area among the raised area of the pillows 116 when the package is heated (e.g., with microwave energy as described above). In the illustrated embodiment, the susceptor 105 extends over both the pillows 116 and the recess 126; however, the microwave energy interactive material 104 could be deactivated (e.g., chemically deactivated) over at least a portion of the recess 126. Alternatively, the microwave energy interactive material 104 could be applied in a pattern so that some or all of the recess 126 and the bonded region 124 is free from the microwave energy interactive material 104. The bonded region 124 and/or the recess 126 could be otherwise shaped, arranged, positioned, and/or configured without departing from the disclosure.

The present embodiment can include several benefits of the pillows 116 formed by expansion of the closed cells 114 in the microwave packaging material 100. For example, the water vapor and air pockets in the closed cells 114 provide significant insulation between the food product in the microwave packaging material 100 and the interior surfaces of the microwave oven. The base of a microwave oven, for example, the glass tray found in many microwave ovens, can act as a large heat sink, absorbing much of the heat generated by the susceptor film 105 or within the food product itself. The vapor pockets in the pillows 116 formed according to the present disclosure may be used to insulate the food product and susceptor film 105 from the microwave oven surfaces and the vented air in the microwave oven cavity, thereby increasing the amount of heat that stays within or is transferred to the food product. In another example, the formation of the pillows 116 can help the microwave packaging material 100 to more closely conform to the food product, placing the susceptor film 105 in closer contact with the food product. This close contact enhances the ability of the susceptor film 105 to brown and/or crisp the surfaces of the food product by conduction heating in addition to some convection heating of the food product.

In the illustrated embodiment, the bonded region 124 and the recess 126 can extend among the pillows 116 so that the bonded region 124 and the recess 126 extend along the food product held by the microwave packaging material 100. For example, the recess 126 can provide space and/or a pathway for venting moisture from the food product so that the food product does not become soggy due to the accumulation of moisture. In one embodiment, the recess 126 could collect moisture (e.g., in a bottom of a construct formed from the microwave packaging material) and/or could provide a passageway for the moisture to vent at an edge of the microwave packaging material 100. In another embodiment, the microwave packaging material 100 could have one or more apertures (not shown) extending in the bonded regions 124 for allowing moisture to exit the construct formed from the microwave packaging material 100. In the illustrated embodiment, moisture (e.g., excess moisture from the food product) can collect directly in the recess 126 formed by the bonded region 124 and/or can move along the channels 118 between the cells 114 and into the recess 126 so that the moisture moves away from the food product. This can help the susceptor 105 brown and/or crisp the surface of the food product and/or can help keep the food item from becoming soggy with excess moisture during heating. The bonded region 124 also can form channels, recesses, or other generally flattened areas 126 on the exterior of the microwave packaging material 100 so that graphics (e.g., heating instructions, logos, etc.) can be disposed on the bonded regions 124, which can help the graphics to experience less distortion (e.g., as compared to graphics on the portion of the microwave packaging material 100 where the pillows 116 are formed) so that the graphics can remain generally readable during and/or after heating.

In one embodiment, the "quilted" areas of the microwave packaging material 100 with the closed cells 114 can help retain more moisture in the food item (e.g., by providing a more torturous path for escape of the moisture) than the recess 126. Since microwave packaging material 110 generally is not pressed against the food item along the recess 126, the recess generally can form gaps between and/or adjacent the quilted portions of the material when the construct is heated. Moisture (e.g., in the form of liquid and/or vapor) can collect in the gaps along the recess 126 (e.g., directly from a food product and/or via the channels 118 formed between the pillows 116 by the pattern of adhesive 112) and/or can escape at the ends of the package via the recess 126 when the construct is heated. Accordingly, the quilted portions and the bonded regions can cooperate in a wrap or other construct formed by the microwave packaging material 100 to press portions of the interior surface of the material against the food item while providing recesses via which moisture can move away from the food item when heated. In one embodiment, this cooperation can help improve heating, crisping, browning, etc. of a food item since at least a portion of the susceptor 105 can be pressed against the food item, while moisture, which can reduce the effectiveness of the susceptor for crisping, browning, etc., of a food item, can move away from the food item.

Figure 4:
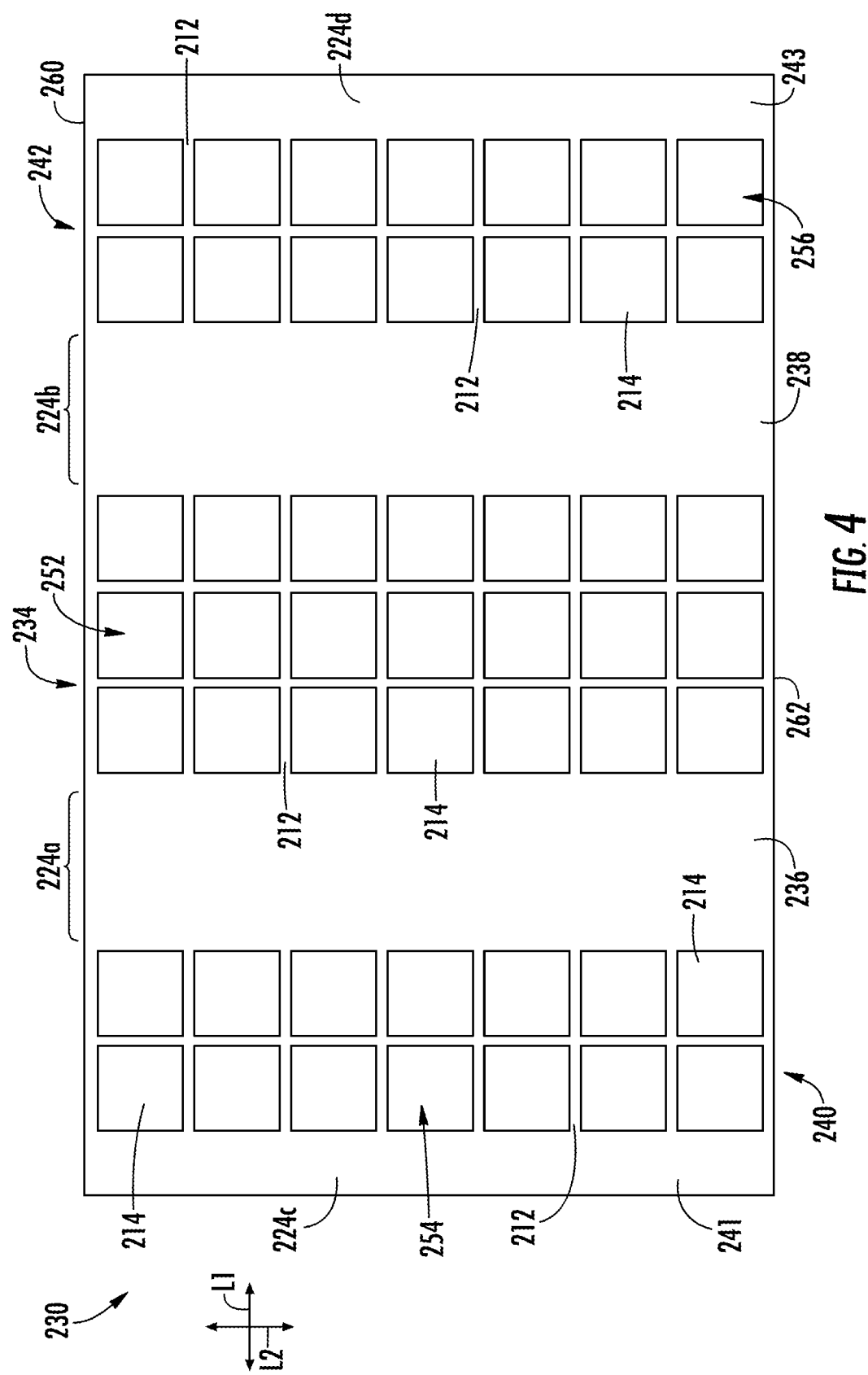
FIG. 4 is a schematic plan view of a blank comprising a packaging material that is similar or identical to the packaging material of FIGS. 1-3 according to a first exemplary embodiment of the disclosure.
Figure 5:
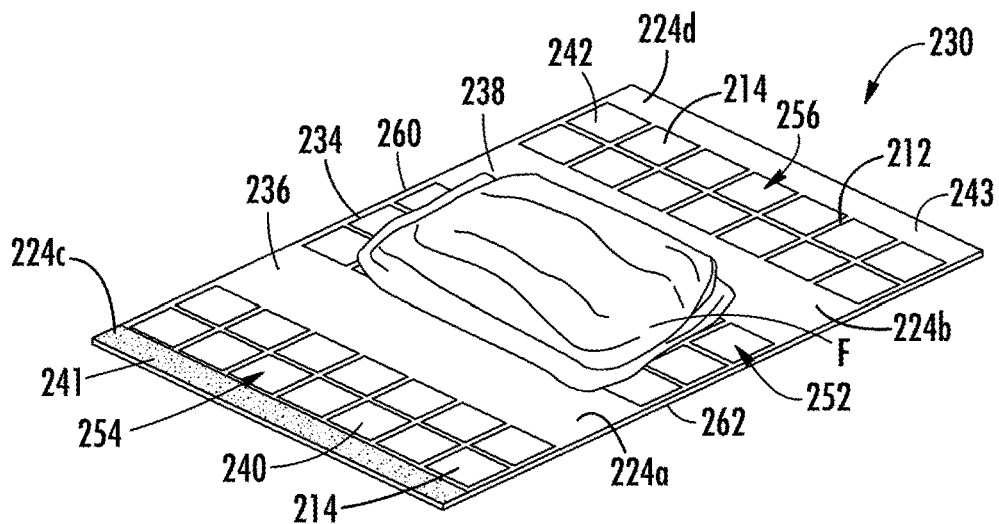
FIGS. 5 and 6 are schematic perspective views showing the wrapping of the blank of FIG. 4 around a food item according to the first exemplary embodiment of the disclosure.
Figure 6:
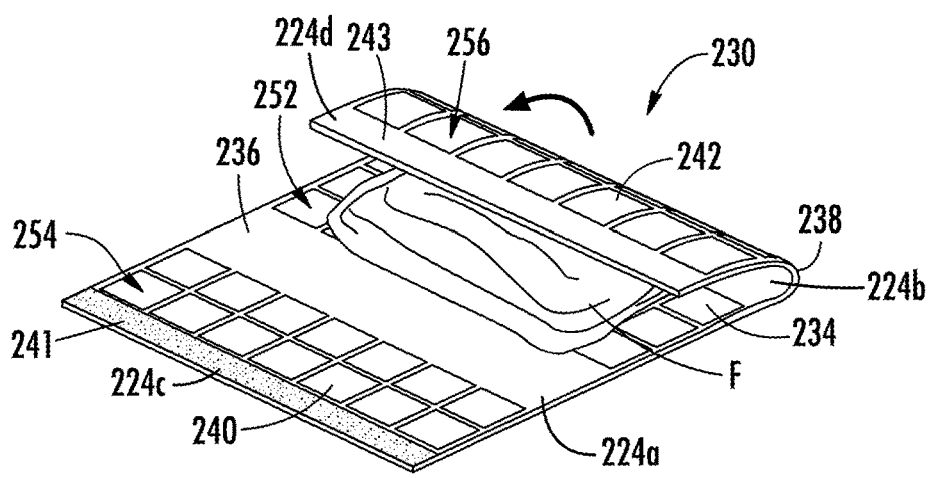
Figure 7:
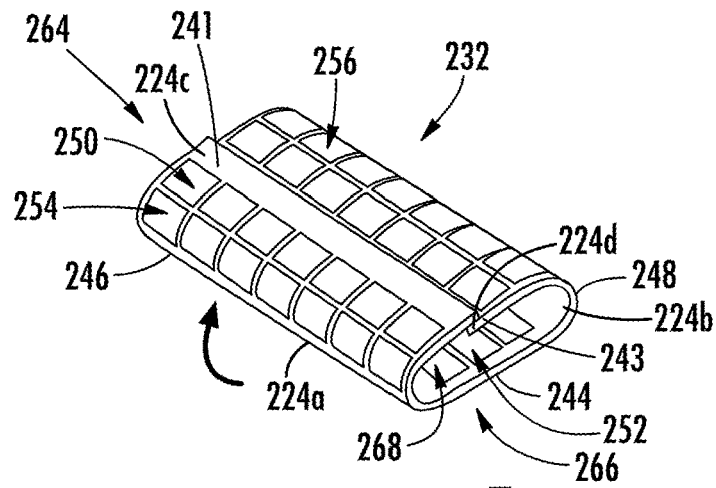
FIG. 7 is a schematic perspective view of a wrap formed from the blank of FIG. 4 according to the first exemplary embodiment of the disclosure.

In a first exemplary embodiment, the packaging material can be in the form of a blank 230 (e.g., a flexible blank) for forming a wrap 232 (FIG. 7) or other construct. The blank 230 can comprise the microwave packaging material 100 as described above. In one embodiment, the wrap 232 can be wrapped around an elongate and/or irregularly shaped food product F (e.g., a burrito) (FIGS. 5 and 6). The blank 230 can have a longitudinal axis L1 and a lateral axis L2. In the illustrated embodiment, the flexible blank 230 can include a top portion 234 connected to a first side portion 236 and a second side portion 238. The first side portion 236 can be connected to a first bottom portion 240 with a marginal portion 241, and the second side portion 238 can be connected to a second bottom portion 242 with a marginal portion 243. As shown in FIGS. 4 and 7, when the construct 232, which is shown upside-down in FIG. 7, is formed from the blank 230, the top portion 234 can form a top 244 of the wrap 232, the side portions 236, 238 can extend generally perpendicular to the top 244 (e.g., vertically) to form the sides 246, 248 of the wrap 232, and the bottom portions 240, 242 can be partially overlapped at their respective marginal portions 241, 243 to form a bottom 250 of the wrap 232. In one embodiment, the overlapped areas 241, 243 of the bottom portions 240, 242 can be glued, welded, and/or otherwise secured together. The blank 230 could be otherwise shaped, arranged, and/or configured without departing from the disclosure.

As shown in FIG. 4, the blank 230 can include a plurality of closed cells 214 defined by a grid of sealed areas or patterns of adhesive 212. In the illustrated embodiment, the closed cells 214 and the patterns of adhesive 212 can be similar or identical to the respective closed cells 114 and adhesive pattern 112 as described above with respect to FIGS. 1-3. As shown in FIG. 4, the cells 214 can be arranged in a plurality of arrays. In the illustrated embodiment, the blank 230 includes a first or top array 252 on the top portion 234, a second or bottom array 254 on the first bottom portion 240, and a third or bottom array 256 on the second bottom portion 242. In the illustrated embodiment, the top array 252 has three columns and seven rows of cells 214 (e.g., 3×7 arrangement), and each of the bottom arrays 254, 256 has two columns and seven rows of cells 214 (e.g., 2×7 arrangements). The blank 230 could be configured to have any suitable number of arrays having any suitable row/column arrangement (e.g., 1×2, 2×2, 1×6, 3×6, 2×6, 3×5, 4×5, 2×9, 5×15, 4×4, etc.) such as by varying the size and/or shape of the blank 230, the cells 214, the patterns of adhesive 212, and/or the bonded regions as described below. The closed cells 214 and/or the patterns of adhesive 212 could be omitted or could be could be otherwise shaped, arranged, positioned, and/or configured without departing from the disclosure. For example, the closed cells 214 are shown in FIG. 4 as being generally rectangular; however, the closed cells 214 could be any suitable size and/or shape.

In the illustrated embodiment, the blank 230 can include bonded regions 224a, 224b, 224c, 224d where closed cells are not formed. In one embodiment, the bonded regions 224a, 224b, 224c, 224d can be similar or identical to the bonded region 124 as described above with respect to FIGS. 1-3. As shown in FIG. 4, the bonded region 224a extends in the side portion 236 (e.g., between the arrays 252, 254) so as to extend in the side 246 in the formed wrap 232 (FIG. 7), the bonded region 224b extends in the side portion 238 (e.g., between the arrays 252, 256) so as to extend along the side 248 in the formed wrap 232, and the bonded regions 224c, 224d extend in the respective marginal portions 241, 243. In the illustrated embodiment, each of the bonded regions 224a, 224b, 224c, 224d extend along a width of the blank 230 in the lateral direction L2, from a first longitudinal edge 260 of the blank 232 to a second longitudinal edge 262 of the blank. As shown in FIG. 4, each of the bonded regions has a width measured in the longitudinal direction L1 that is significantly larger than the spacing between any two adjacent cells 214 (e.g., the width of the portions of the pattern of adhesive 212 that extend between the cells 214). In one embodiment, the widths of the bonded regions can be comparable to the widths of the cells 214. In one example, the cells 214 can be square with approximately 1 inch sides, and each of the bonded regions 224a, 224b, 224c, 224d can have a width measured in the longitudinal direction L1 of approximately 0.75 inch to approximately 2 inches, while the spacing between adjacent cells 214 can be approximately 0.125 inch. Any of the bonded regions 224a, 224b, 224c, 224d could be omitted or could be could be otherwise shaped, arranged, positioned, and/or configured without departing from the disclosure. For example, the bonded regions could have any suitable size and/or shape.

As shown in FIG. 5, a food item F can be placed on the blank 230. In the illustrated embodiment, the food item F can be centered on the array 252 on the top portion 234 of the blank 230. As shown in FIGS. 6 and 7, the blank 230 can be formed into the wrap 232 around the food item F by folding the side portion 238 and the bottom portion 242 over the food item F to form the side 248 and a first portion of the bottom 250. The side portion 236 and the bottom portion 240 also can be folded over the food item F to form the side 244 and the remainder of the bottom 250. The marginal portion 241 can at least partially overlap the marginal portion 243 and the marginal portions can be glued or otherwise secured together (e.g., welding) to form the bottom 250 of the wrap 232. Folded in this manner, the wrap 232 generally forms a sleeve around the food item F and can have generally open ends 264, 266.

In the illustrated embodiment, the wrap 232 with the food item F contained in its interior 268 (FIG. 7) can be placed in a microwave oven (e.g., with the bottom 250 resting on a bottom surface of the microwave oven, not shown) and exposed to microwave energy. The microwave energy can cause the cells 214 to expand (e.g., into the pillows 116 as described above with respect to FIG. 3). The expanded cells 214 or pillows of the heated wrap 232 (not shown) can press at least a portion of the interior surface of the wrap 232 against the food item F (e.g., to bring the susceptor 105—e.g., FIGS. 1-3—into closer contact with the food item F) and can help insulate the food item F. The bonded regions 224a, 224b, 224c, 224d can form recesses extending along the food item F adjacent to the cells 214 and extending to the ends 264, 266 of the wrap 232. In the illustrated embodiment, the bonded regions 224a, 224b can provide passageways for moisture (e.g., water vapor and/or steam) to escape from the interior 268 along the sides 246, 248 to the ends 264, 266 of the wrap 232. As shown in FIG. 7, the bonded regions 224c, 224d, which are at least partially overlapped in the wrap 232, can cooperate to form a recess extending along the bottom 250 of the wrap, between the arrays 254, 256 of the cells 214 that have expanded into pillows during heating. Accordingly, the recess formed by the bonded regions 224c, 224d can allow moisture to collect in the bottom 250 away from the food item F and/or to escape the wrap 232 via the ends 264, 266. The wrap 232 could be otherwise shaped, arranged, positioned, and/or configured without departing from the disclosure.

Figure 8:
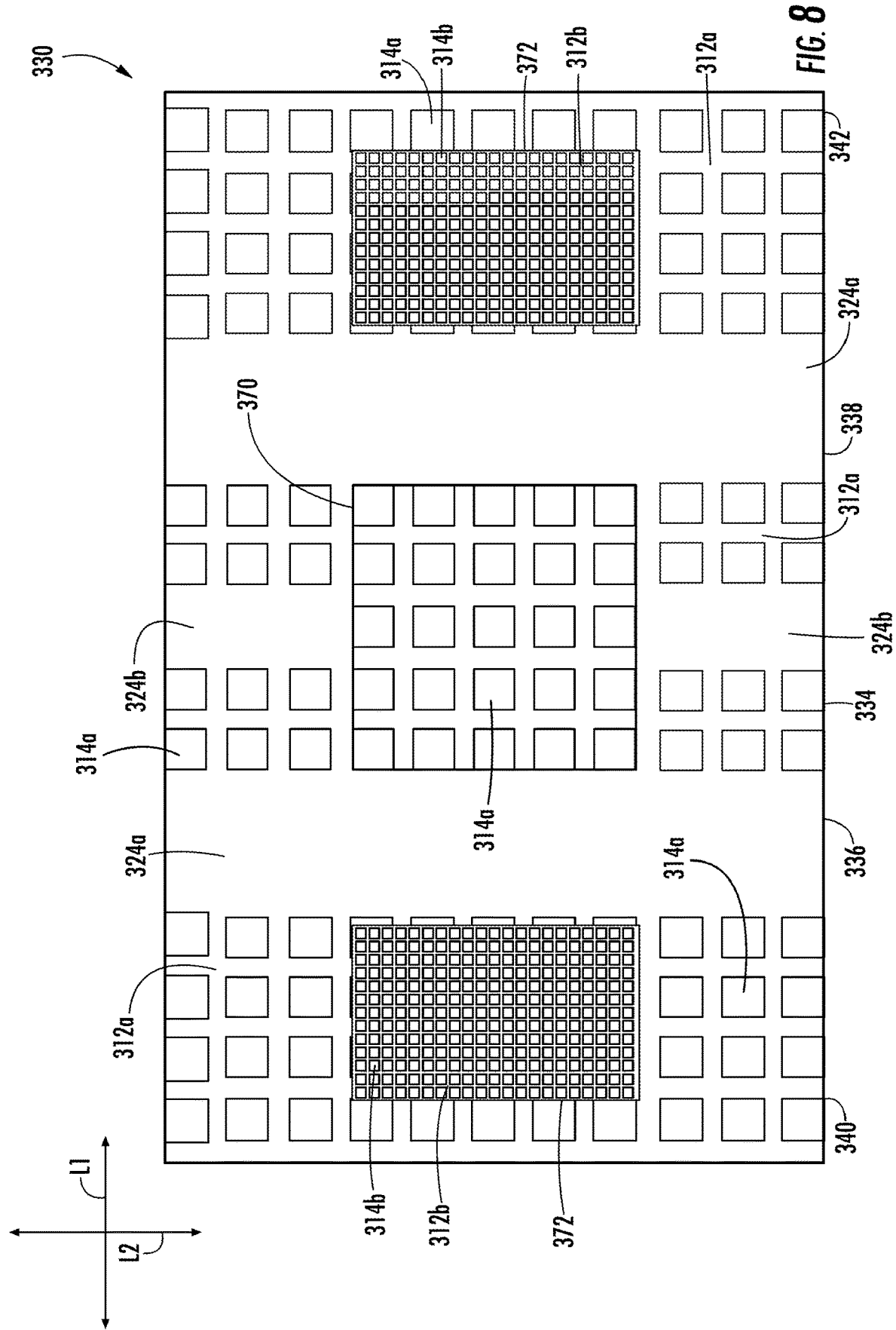
FIG. 8 is a schematic plan view of a blank comprising a packaging material that is similar or identical to the packaging material of FIGS. 1-3 according to a second exemplary embodiment of the disclosure.

FIG. 8 is a plan view of a blank 330 for forming a construct (not shown) of a second embodiment of the disclosure. The second embodiment is generally similar to the previous embodiments, except for variations noted and variations that will be apparent to one of ordinary skill in the art. Accordingly, similar or identical features of the embodiments have been given like or similar reference numbers. As shown in FIG. 8, the blank 330 (e.g., a flexible blank) can be for forming a wrap or other construct (not shown), which can be wrapped around an elongate and/or irregularly shaped food product (not shown). The blank 330 can have a longitudinal axis L1 and a lateral axis L2. In the illustrated embodiment, the flexible blank 330 can include a bottom portion 334 connected to a first side portion 336 and a second side portion 338. The first side portion 336 can be connected to a first top portion 340, and the second side portion 338 can be connected to a second top portion 342. When the construct is formed from the blank 330, the bottom portion 334 can form a bottom of the package, the side portions 336, 338 can extend generally upwardly from the bottom portion 334 to form the sides of the package, and the top portions 340, 342 can be partially overlapped at their respective marginal areas to form a top of the package. In one embodiment, the overlapped areas of the top portions 340, 342 can be glued, welded, and/or otherwise secured together. The blank 330 could be could be otherwise shaped, arranged, and/or configured without departing from the disclosure.

In the illustrated embodiment, the material of the blank 330 can be identical or similar to the microwave packaging material 100 as described above with respect to FIGS. 1-3. As shown in FIG. 8, the packaging material of the blank 330 can include a plurality of closed cells 314a defined by a pattern of adhesive 312a. In the illustrated embodiment, the blank 330 can also include a plurality of closed cells 314b defined by a pattern of adhesive 312b, wherein the closed cells 314b are smaller than the closed cells 314a. In one example, the closed cells 314a, 314b and the patterns of adhesive 312a, 312b can be similar or identical to the closed cells 114 and adhesive patterns 112 as described above with respect to FIGS. 1-3. The closed cells 314a, 314b and/or the adhesive patterns 312a, 312b could be omitted or could be could be otherwise shaped, arranged, positioned, and/or configured without departing from the disclosure. For example, the closed cells 314a, 314b are shown in FIG. 8 as being generally rectangular; however, the closed cells could be any suitable shape.

As shown in FIG. 8, the blank 330 can include a bottom susceptor area 370 extending on the bottom portion 334 and two top susceptor areas 372 extending on the respective top portions 340, 342. In one embodiment, each of the susceptor areas 370, 372 can comprise a metal layer or coating disposed on the interior surface of the blank 330 so that the susceptor are 370 extends over a number of the closed cells 314a and the adhesive patterns 312a of the bottom portion 334, and the susceptor areas 372 extend over a respective number of the closed cells 314b and the adhesive patterns 312b in the respective top portions 340, 342. As shown in FIG. 8, the susceptor areas 372 can extend over all of the closed cells 314b and the adhesive patterns 312b. Accordingly, as the closed cells 314a, 314b expand when heating the package with microwave energy, the expanding cells can at least partially press the susceptor material extending on the interior surface of the susceptor areas 370, 372 against the outer surface of the food item. In one embodiment, the susceptor areas 370, 372 can be similar or identical to the susceptor 105 as described above with respect to FIGS. 1-3. In the illustrated embodiment, the areas of the blank 330 outside the susceptor areas 370, 372 can include a deactivated susceptor or can be devoid of a susceptor. Any of the susceptor areas 370, 372 could be omitted or could be could be otherwise shaped, arranged, positioned, and/or configured without departing from the disclosure.

In the illustrated embodiment, the blank 330 can include bonded regions 324a, 324b where closed cells are not formed. In one example, the bonded regions 324a, 324b can be similar or identical to the bonded region 124 as described above with respect to FIGS. 1-3. Accordingly, each of the bonded regions 324a, 324b can remain generally flat (no expanding cells) when the package is heated with microwave energy and/or otherwise. As shown in FIG. 8, the side bonded regions 324a can extend in the respective side portions 336, 338 of the blank 330, and the bottom bonded regions 324b can extend in respective portions of the bottom portion 334. In one embodiment, the bonded regions 324a, 324b can be disposed in portions of the blank 330 that generally do not need to be pressed against the exterior surface of the food item (e.g., outside the susceptor areas 370, 372). In one exemplary embodiment, the side bonded regions 324a can provide gaps along the sides of the package formed from the blank 330 for moisture to collect and/or to escape through the ends of the package. Similarly, the bottom bonded regions 324b can provide channels where moisture (e.g., liquid water) can collect and/or drain through the ends of the package. Any of the bonded regions 324a, 324b could be omitted or could be could be otherwise shaped, arranged, positioned, and/or configured without departing from the disclosure.

Figure 9:
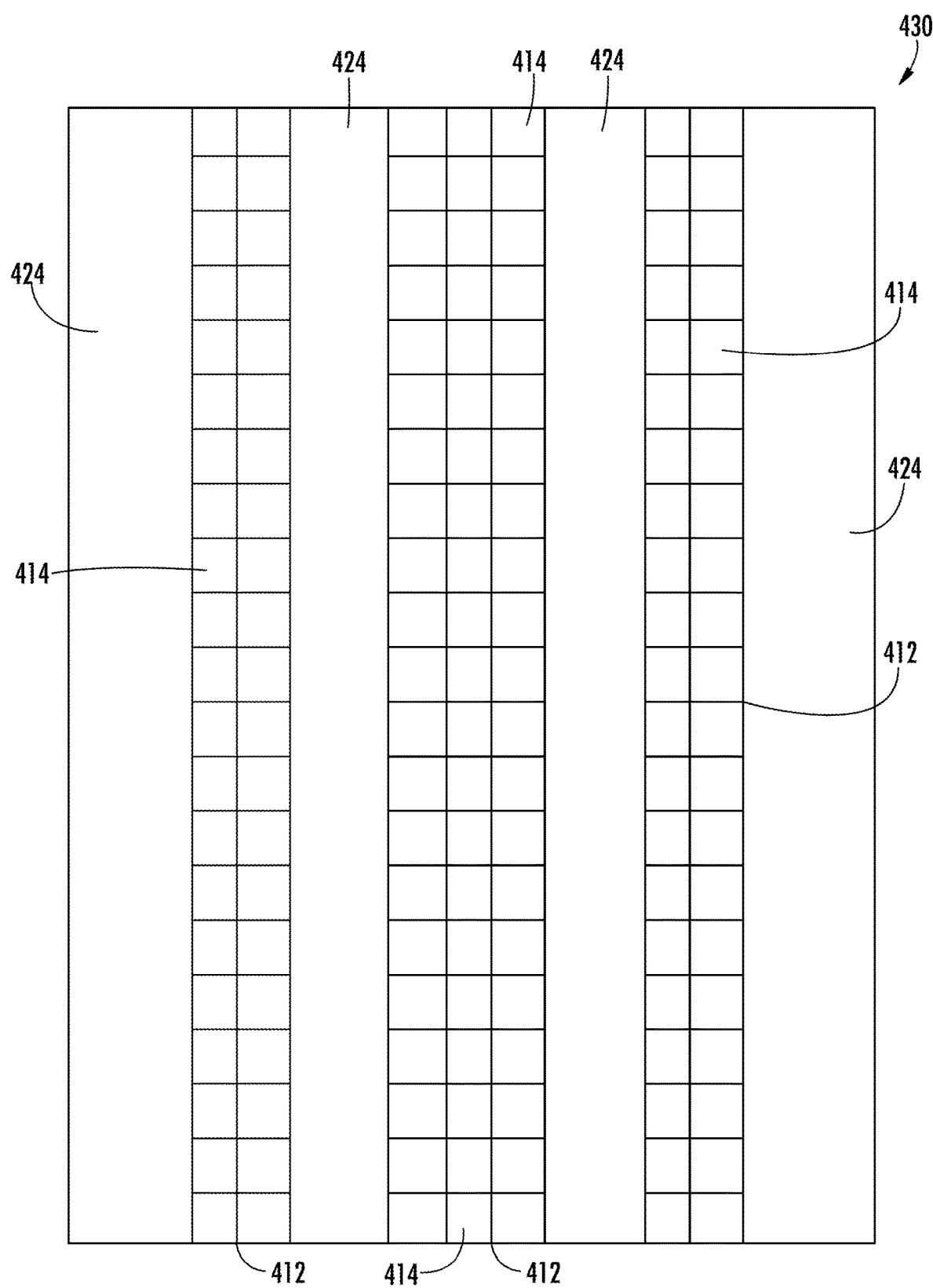
FIG. 9 is a schematic plan view of a blank comprising a packaging material that is similar or identical to the packaging material of FIGS. 1-3 according to a third exemplary embodiment of the disclosure.

FIG. 9 is a plan view of a blank 430 for forming a construct (not shown) of a third embodiment of the disclosure. The third embodiment is generally similar to the previous embodiments, except for variations noted and variations that will be apparent to one of ordinary skill in the art. Accordingly, similar or identical features of the embodiments have been given like or similar reference numbers. As shown in FIG. 9, the blank 430 can include closed cells 414 with adhesive patterns 412. Bonded regions 424 can extend between the quilted areas of the blank and along the marginal ends of the blank. One or more susceptors (not shown) can be included on an interior surface of the blank 430. The blank 430 could be otherwise shaped, arranged, and/or configured without departing from the disclosure.

Figure 10:
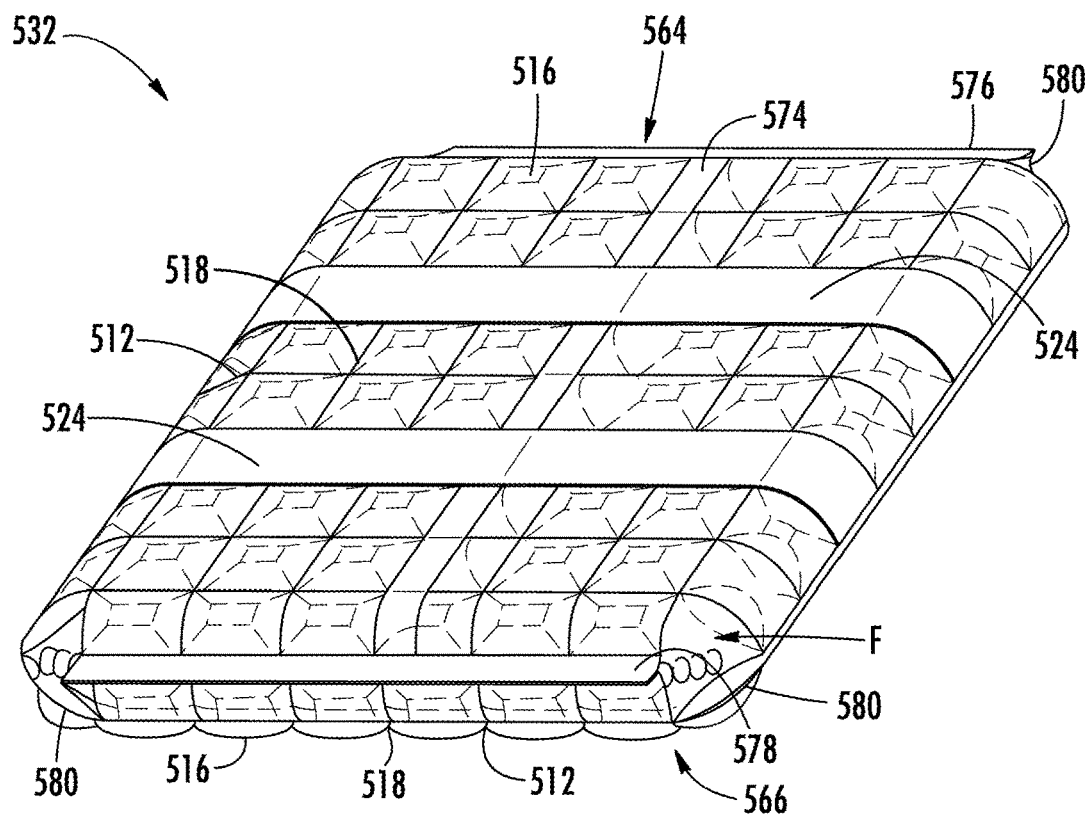
FIG. 10 is a schematic perspective view of a pouch comprising a packaging material that is similar or identical to the packaging material of FIGS. 1-3 according to a fourth exemplary embodiment of the disclosure.

FIG. 10 is a perspective view of a construct or pouch 532 of a fourth embodiment of the disclosure. The fourth embodiment is generally similar to the previous embodiments, except for variations noted and variations that will be apparent to one of ordinary skill in the art. Accordingly, similar or identical features of the embodiments have been given like or similar reference numbers. As shown in FIG. 10, wherein the pouch 532 is shown with its bottom facing upwardly, the pouch 532 can be formed from a blank similar to the blanks 230, 330 as described above that can be wrapped around a food item F so that overlapping marginal portions can be secured together (e.g., glued, heat sealed, etc.) to form a bottom seam 574. Additionally, marginal portions at the ends 564, 566 of the pouch 532 can be secured together to form respective end seals 576, 578. In the illustrated embodiment, the pouch 532 can have corner openings 580 adjacent the end seals 576, 578.

As shown in FIG. 10, the pouch 532 can be formed from a packaging material that is similar or identical to the microwave packaging material 100 as shown in FIGS. 1-3. In the illustrated embodiment, the microwave packaging material of the pouch 532 is shown in the heated, activated state. Accordingly, the pouch 532 includes a plurality of closed cells that have expanded into the pillows 516, wherein the closed cells are defined by a pattern of adhesive 512 that forms the channels 518. Also, the pouch 532 includes two bonded regions 524 extending along the food item F and adjacent the expanded cells 516. In the illustrated embodiment, the bonded regions 524 can form channels/recesses in the bottom of the pouch 532 for collecting moisture, for example. The pouch 532 could be otherwise shaped, arranged, and/or configured without departing from the disclosure. For example, one or more bonded regions could extend to one or more of the openings 580 of the pouch 532.

Figure 11:
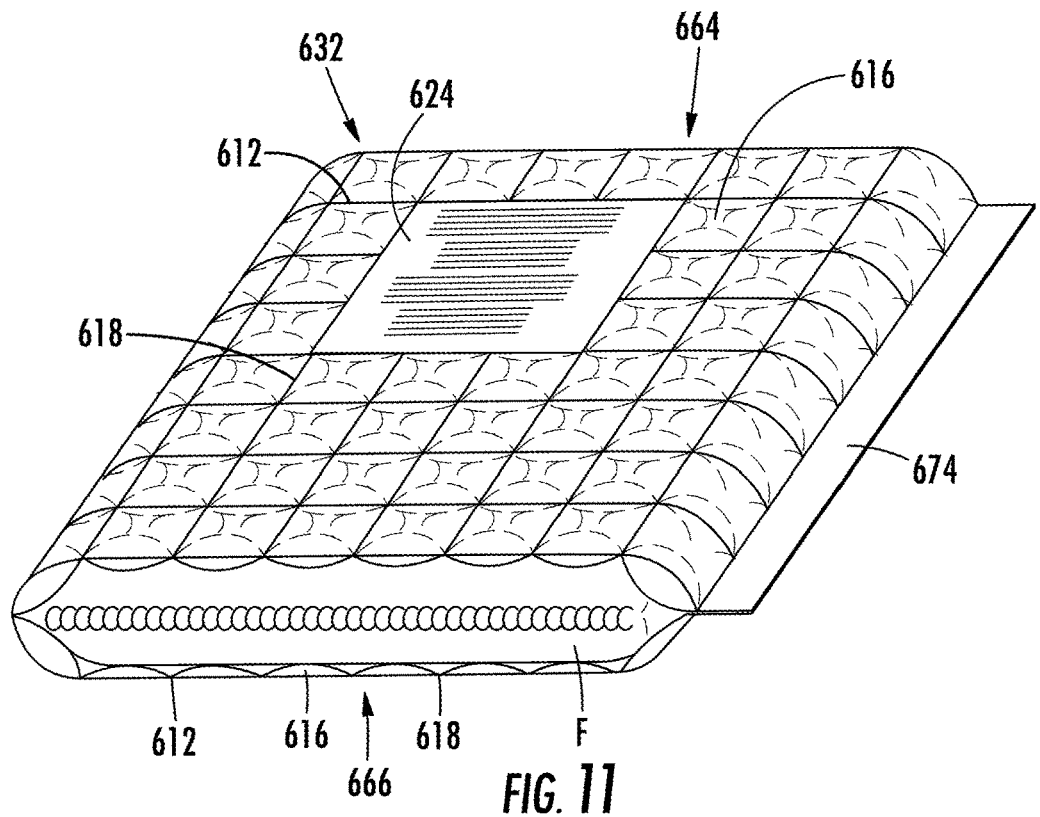
FIG. 11 is a schematic perspective view of a pouch comprising a packaging material that is similar or identical to the packaging material of FIGS. 1-3 according to a fifth exemplary embodiment of the disclosure.

FIG. 11 is a perspective view of a construct or wrap or pouch 632 of a fifth embodiment of the disclosure. The fifth embodiment is generally similar to the previous embodiments, except for variations noted and variations that will be apparent to one of ordinary skill in the art. Accordingly, similar or identical features of the embodiments have been given like or similar reference numbers. As shown in FIG. 11, the pouch 632 can be formed from a blank similar to the blanks 230, 330 as described above that can be wrapped around a food item F so that overlapping marginal portions can be secured together (e.g., glued, heat sealed, etc.) to form a side seam 674. In the illustrated embodiment, the pouch 632 can have open ends 664, 666. Alternatively, marginal portions at the ends 664, 666 of the pouch 632 could be secured together to form respective end seals. As shown in FIG. 11, the pouch 632 can be formed from a packaging material that is similar or identical to the microwave packaging material 100 as shown in FIGS. 1-3. In the illustrated embodiment, the microwave packaging material of the pouch 632 is shown in the heated, activated state. Accordingly, the pouch 632 includes a plurality of closed cells that have expanded into the pillows 616, wherein the closed cells are defined by a pattern of adhesive 612 that forms the channels 618.

In the illustrated embodiment, the pouch 632 can include at least one bonded region 624 extending along the food item F and adjacent the expanded cells 616. In the illustrated embodiment, graphics (e.g., logos, figures, etc.) and/or text (e.g., heating instructions) can be printed on the packaging material of the pouch and aligned with the bonded region 624. In one embodiment, since the bonded region 624 generally does not expand during heating, the text and/or graphics printed thereon will remain generally undistorted during and/or after heating of the pouch 632 and the food item F. In contrast, graphics and/or text printed on the cells may become distorted and possibly unreadable as the cells expand to form the pillows 616 during heating. The bonded region 624 also can form a recess in the pouch 632 for collecting moisture, for example. The pouch 632 could be otherwise shaped, arranged, and/or configured without departing from the disclosure.

Figure 12:
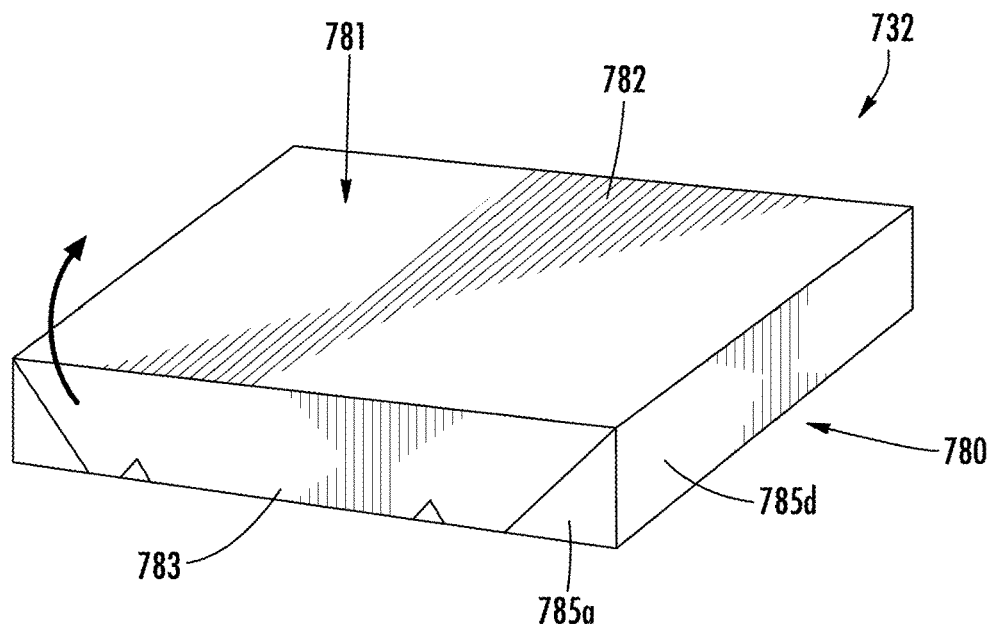
FIGS. 12 and 13 are schematic perspective views of a carton comprising a packaging material that is similar or identical to the packaging material of FIGS. 1-3 according to a sixth exemplary embodiment of the disclosure.
Figure 13:
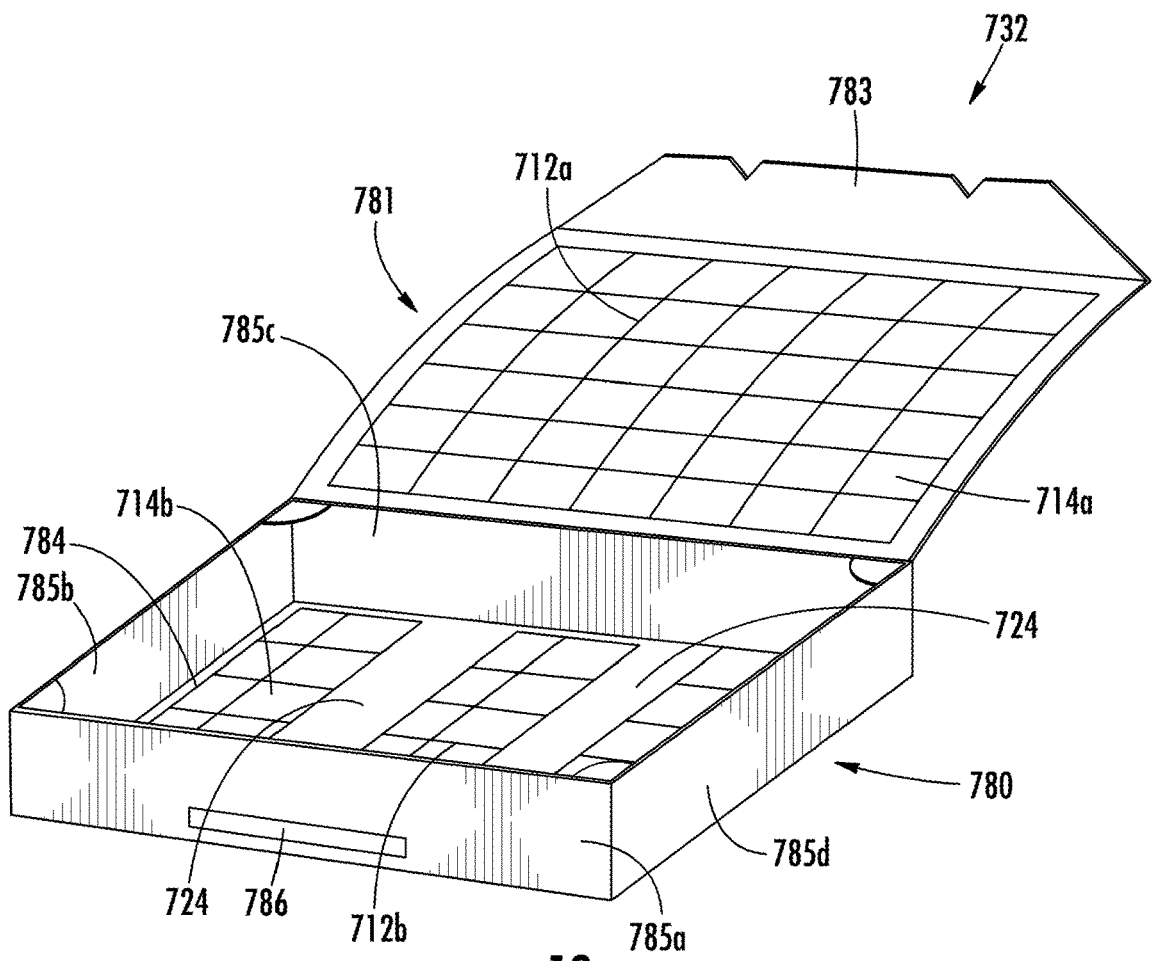

FIGS. 12 and 13 are perspective views of a construct or carton 732 of a sixth embodiment of the disclosure. The sixth embodiment is generally similar to the previous embodiments, except for variations noted and variations that will be apparent to one of ordinary skill in the art. Accordingly, similar or identical features of the embodiments have been given like or similar reference numbers. As shown in FIGS. 12 and 13, the carton 732 includes a tray 780 and a lid 781 including a top panel 782 foldably connected to a tab 783. The tray 780 can include a bottom panel 784 and four side panels 785a, 785b, 785c, 785d extending upwardly from the bottom panel 784. In the illustrated embodiment, FIG. 12 shows the carton 732 in the closed position with the lid 781 covering the tray 780 and a food item (not shown) therein. In one embodiment, the tab 783 may be removably sealed to the front side panel 785a of the tray 780. As shown in FIG. 13, the top panel 782 can be foldably connected to the back side panel 785c. In one embodiment, vent holes or other suitable venting features (not shown) may be provided in the carton 732.

As shown in FIG. 13, the lid 781 may be folded upwardly at the back side panel 785c (e.g., in the direction of arrow A1). In the illustrated embodiment, the lid 781 can be reclosed by pivoting the lid 781 downwardly over the tray 780 and engaging the tab 783 with a corresponding slot 786 (FIG. 13). The carton 732 could be otherwise shaped, arranged, and/or configured without departing from the disclosure.

As shown in FIG. 13, the interior surfaces of the lid 781 and the bottom panel 784 of the tray 780 may include respective packaging materials that can be similar or identical to the microwave packaging material 100 described above with respect to FIGS. 1-3. In one example, the packaging materials can be glued or otherwise secured to the interior surfaces of the lid 781 and the bottom panel 784. Alternatively, the packaging materials could be integrally formed with the lid 781 and/or the bottom panel 784. In one embodiment, the packaging material of the lid 781 can include a plurality of closed cells 714a defined by a pattern of adhesive 712a and the packaging material of the bottom panel 784 can include a plurality of closed cells 714b defined by a pattern of adhesive 712b. In addition, the bottom panel 784 can include bonded regions 724 disposed among the closed cells 714b for forming recesses/channels in the bottom of the tray 780 (e.g., for collecting moisture during heating of a food item). In one embodiment, the food item (e.g., pizza, calzone, burrito, sandwich, etc.) heated and/or held in the carton 732 is generally large relative to the size of the carton so that one food item or a small number of food items generally fill the interior space of the carton. The packaging materials of the carton 732, including the cells 714a, 714b, the adhesive patterns 712a, 712b, and the bonded regions 724 could be otherwise shaped, arranged, and/or configured without departing from the disclosure. For example, the tray 780 could include additional cells 714b on any of the side panels 785a, 785b, 785c, 785d. In another example, the carton 732 could include any suitable number of bonded regions 724 having any suitable size and/or shape.

Figure 14:
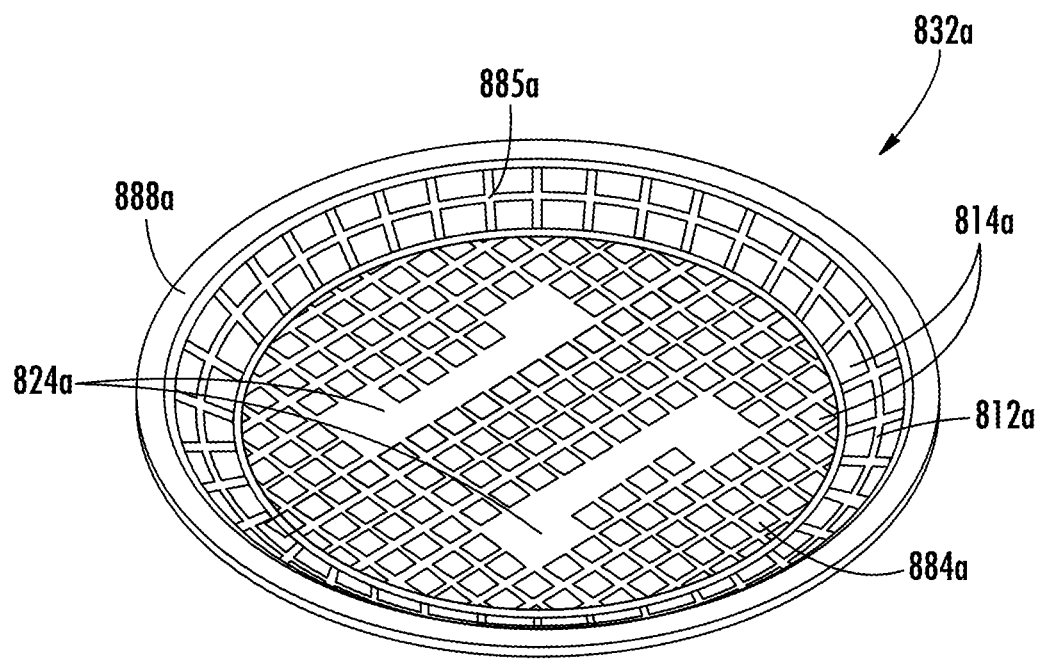
FIGS. 14 and 15 are schematic perspective views of respective trays comprising a packaging material that is similar or identical to the packaging material of FIGS. 1-3 according to a seventh exemplary embodiment of the disclosure.
Figure 15:
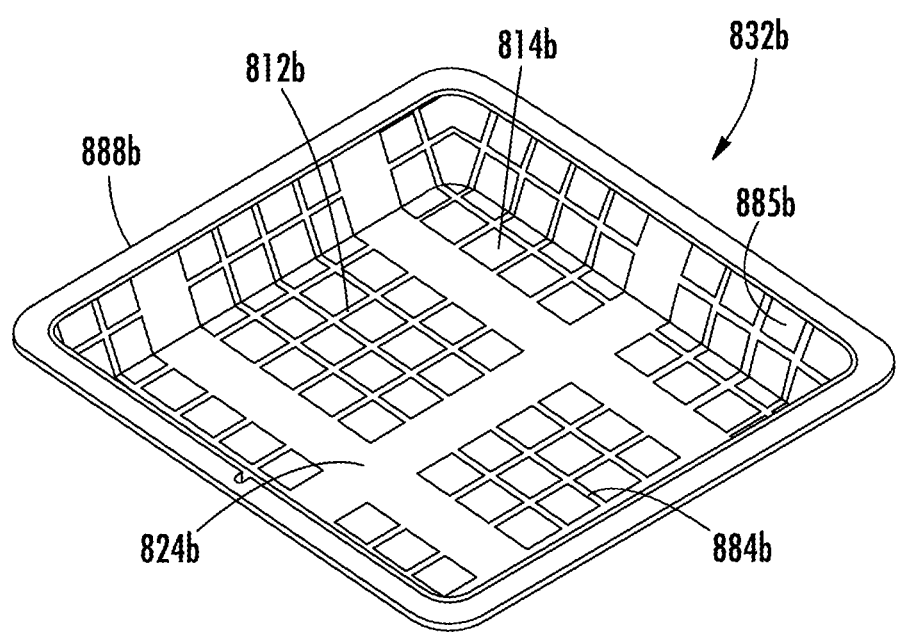

FIGS. 14 and 15 are perspective views of respective constructs or trays 832a, 832b of a seventh embodiment of the disclosure. The seventh embodiment is generally similar to the previous embodiments, except for variations noted and variations that will be apparent to one of ordinary skill in the art. Accordingly, similar or identical features of the embodiments have been given like or similar reference numbers. As shown in FIG. 14, the tray 832a is generally circular and can have a bottom wall 884a, a sidewall 885a extending generally upwardly from the bottom wall 884a and around a circumference of the bottom wall 884a, and a rim 888a extending outwardly from an upper portion of the sidewall 885a. In one embodiment, the tray 832a can be formed by press-forming a blank (not shown) or by any other suitable method. In the illustrated embodiment, the tray 832a can include a plurality of closed cells 814a defined by a pattern of adhesive 812a extending on at least the bottom wall 884a and the sidewall 885a. As shown in FIG. 14, bonded regions 824a can extend on the bottom wall 884a of the tray 832a. In one embodiment, the closed cells 814a, the adhesive pattern 812a, and/or the bonded regions 824a can be similar or identical to the closed cells 114, the adhesive pattern 112, and the bonded region 124 of the microwave packaging material 100 described above with respect to FIGS. 1-3. The tray 832a could be otherwise shaped, arranged, and/or configured without departing from the disclosure. For example, the tray 832a could include any suitable number of bonded regions 824a having any suitable size and/or shape.

Similarly, as shown in FIG. 15, the tray 832b can be generally rectangular or square and can have a bottom wall 884b, a sidewall 885b extending generally upwardly from the bottom wall 884b and around a perimeter of the bottom wall 884b, and a rim 888b extending outwardly from an upper portion of the sidewall 885b. In one embodiment, the tray 832b can be formed by press-forming a blank (not shown) or by any other suitable method. In the illustrated embodiment, the tray 832b can include a plurality of closed cells 814b defined by a pattern of adhesive 812b extending on at least the bottom wall 884b and the sidewall 885b. As shown in FIG. 15, bonded regions 824b can extend on the bottom wall 884b and the sidewall 885b of the tray 832b. In one embodiment, the closed cells 814b, the adhesive pattern 812b, and/or the bonded regions 824b can be similar or identical to the closed cells 114, the adhesive pattern 112, and the bonded region 124 of the microwave packaging material 100 described above with respect to FIGS. 1-3. The tray 832b could be otherwise shaped, arranged, and/or configured without departing from the disclosure. For example, the tray 832b could include any suitable number of bonded regions 824b having any suitable size and/or shape.

Any of the features of the various embodiments of the disclosure can be combined with, replaced by, or otherwise configured with other features of other embodiments of the disclosure without departing from the scope of this disclosure. Further, it is noted that the constructs and blanks of the various embodiments are included by way of example, and the features of the microwave packaging material 100 can be incorporated into any suitable blank or other construct. For example, in an alternative embodiment, the construct could be in the form of a flat plate or disc or an insert (not shown). A flat disc having the microwave packaging material 100 could support a food item (e.g., pizza) during heating while allowing moisture to move away from the food item without requiring a press-forming step to form channels (e.g., as is used in press-formed constructs such as trays).

Numerous materials may be suitable for use in forming the various blanks and constructs (e.g. trays) of the invention, provided that the materials are resistant to softening, scorching, combusting, or degrading at typical microwave oven heating temperatures, for example, from about 250° F. to about 425° F. Such materials may include microwave energy interactive materials and microwave energy transparent or inactive materials.

The microwave energy interactive material(s) may be used to form one or more microwave energy interactive elements or features that alter the effect of microwave energy on the adjacent food item. Each microwave energy interactive element comprises one or more microwave energy interactive materials or segments arranged in a particular configuration to absorb microwave energy, transmit microwave energy, reflect microwave energy, or direct microwave energy, as needed or desired for a particular microwave heating construct and food item. The microwave energy interactive element may be configured to promote browning and/or crisping of a particular area of the food item, to shield a particular area of the food item from microwave energy to prevent scorching or overheating, or to transmit microwave energy towards or away from a particular area of the food item.

In the illustrated example, the blank 100 includes a susceptor 130, 132 substantially overlying and joined to at least a portion of the blank 100 that forms or defines at least a portion of a first surface, which may serve as a food-contacting or food bearing surface in proximate or intimate contact with the food item. If desired, a second surface opposite the first surface (i.e., the exterior surface) also may include one or more microwave energy interactive elements.

The susceptor generally comprises a thin layer of microwave energy interactive material (generally less than about 100 angstroms in thickness, for example, from about 60 to about 100 angstroms in thickness, and having an optical density of from about 0.15 to about 0.35, for example, about 0.21 to about 0.28) that tends to absorb at least a portion of impinging microwave energy and convert it to thermal energy (i.e., heat) at the interface with the food item. Susceptor elements often are used to promote browning and/or crisping of the surface of a food item. However, other microwave energy interactive elements, such as those described herein, are contemplated for use with the invention.

For example, the microwave energy interactive element may comprise a foil having a thickness sufficient to reflect substantially all of impinging microwave energy. Such reflective elements may be formed from various materials and may have various configurations, depending on the particular application for which the shielding element is used. Typically, such elements are formed from a conductive, reflective metal or metal alloy, for example, aluminum, copper, or stainless steel. Such elements may have a thickness of from about 0.000285 inches to about 0.05 inches, for example, about 0.0003 inches to about 0.03 inches, for example, about 0.00035 inches to about 0.020 inches, for example, about 0.016 inches.

Larger microwave energy reflecting elements may be used as microwave energy shielding elements, for example, where all or a portion of the food item is prone to scorching or drying out during heating. Smaller microwave energy reflecting elements may be used to diffuse or lessen the intensity of microwave energy. A plurality of smaller microwave energy reflecting elements also may be arranged to form a microwave energy directing element to direct microwave energy to specific areas of the food item. If desired, the loops may be of a length that causes microwave energy to resonate, thereby enhancing the distribution effect. Microwave energy distributing elements are described in U.S. Pat. Nos. 6,204,492, 6,433,322, 6,552,315, and 6,677,563, each of which is incorporated by reference in its entirety.

If desired, any of the numerous microwave energy interactive elements described herein or contemplated hereby may be substantially continuous, that is, without substantial breaks or interruptions, or may be discontinuous, for example, by including one or more microwave energy transparent areas or apertures that transmit microwave energy therethrough. Such areas may be sized and positioned to heat particular areas of the food item selectively. The areas may extend through the entire structure, or only through one or more layers. The number, shape, size, and positioning of such microwave energy transparent areas may vary for a particular application depending on type of construct being formed, the food item to be heated therein or thereon, the desired degree of shielding, browning, and/or crisping, whether direct exposure to microwave energy is needed or desired to attain uniform heating of the food item, the need for regulating the change in temperature of the food item through direct heating, and whether and to what extent there is a need for venting.

It will be understood that the aperture may be a physical aperture or void in one or more layers or materials used to form the construct, or may be a non-physical "aperture". A non-physical aperture is a microwave energy transparent area that allows microwave energy to pass through the structure without an actual void or hole cut through the structure. Such areas may be formed by simply not applying microwave energy interactive material to the particular area, or by removing microwave energy interactive material in the particular area, or by mechanically deactivating the particular area (rendering the area electrically discontinuous). Alternatively, the areas may be formed by chemically deactivating the microwave energy interactive material in the particular area, as described in U.S. Pat. No. 4,865,921, thereby transforming the microwave energy interactive material in the area into a substance that is transparent to microwave energy (i.e., microwave energy inactive). While both physical and non-physical apertures allow the food item to be heated directly by the microwave energy, a physical aperture also provides a venting function to allow steam or other vapors to escape from the interior of the construct. The arrangement of microwave energy interactive and microwave energy transparent areas may be selected to provide various levels of heating, as needed or desired for a particular application.

The arrangement of microwave energy interactive and microwave energy transparent areas may be selected to provide various levels of heating, as needed or desired for a particular application. For example, where greater heating is desired, the total inactive area may be increased. In doing so, more microwave energy is transmitted to the food item. Alternatively, by decreasing the total inactive area, more microwave energy is absorbed by the microwave energy interactive areas, converted into thermal energy, and transmitted to the surface of the food item to enhance browning and/or crisping.

In some instances, it may be beneficial to create one or more discontinuities or inactive regions to prevent overheating or charring of the construct. By way of example, and not limitation, in an exemplary construct, two panels can be in an overlapping relationship with one another. When exposed to microwave energy, the concentration of heat generated by the overlapped panels may be sufficient to cause the underlying support, in this case, paperboard, to become scorched. As such, the overlapping portions of one or both of panels may be designed to be microwave energy transparent, for example, by forming these areas without a microwave energy interactive material, by removing any microwave energy interactive material that has been applied, or by deactivating the microwave energy interactive material in these areas.

Further still, one or more panels, portions of panels, or portions of the construct may be designed to be microwave energy inactive to ensure that the microwave energy is focused efficiently on the areas to be browned and/or crisped, rather than being lost to portions of the food item not intended to be browned and/or crisped or to the heating environment. This may be achieved using any suitable technique, such as those described above.

If desired, the microwave energy interactive element may be supported on a microwave inactive or transparent substrate, for example, a polymer film or other suitable polymeric material, for ease of handling and/or to prevent contact between the microwave energy interactive material and the food item. As used herein the term "polymer" or "polymeric material" includes, but is not limited to, homopolymers, copolymers, such as for example, block, graft, random, and alternating copolymers, terpolymers, etc. and blends and modifications thereof. Furthermore, unless otherwise specifically limited, the term "polymer" shall include all possible geometrical configurations of the molecule. These configurations include, but are not limited to isotactic, syndiotactic, and random symmetries.

Examples of polymer films that may be suitable include, but are not limited to, polyolefins, polyesters, polyamides, polyimides, polysulfones, polyether ketones, cellophanes, or any combination thereof. Other non-conducting substrate materials such as paper and paper laminates, metal oxides, silicates, cellulosics, or any combination thereof, also may be used.

In one particular example, the polymer film comprises polyethylene terephthalate. Examples of polyethylene terephthalate films that may be suitable for use as the substrate include, but are not limited to, MELINEX®, commercially available from DuPont Teijan Films (Hopewell, Va.), and SKYROL, commercially available from SKC, Inc. (Covington, Ga.). Polyethylene terephthalate films are used in commercially available susceptors, for example, the QWIKWAVE® Focus susceptor and the MICRORITE® susceptor, both available from Graphic Packaging International (Marietta, Ga.).

The thickness of the film generally may be from about 35 gauge to about 10 mil. In each of various examples, the thickness of the film may be from about 40 to about 80 gauge, from about 45 to about 50 gauge, about 48 gauge, or any other suitable thickness.

The microwave energy interactive material may be applied to the substrate in any suitable manner, and in some instances, the microwave energy interactive material is printed on, extruded onto, sputtered onto, evaporated on, or laminated to the substrate. The microwave energy interactive material may be applied to the substrate in any pattern, and using any technique, to achieve the desired heating effect of the food item.

For example, the microwave energy interactive material may be provided as a continuous or discontinuous layer or coating including circles, loops, hexagons, islands, squares, rectangles, octagons, and so forth. Examples of various patterns and methods that may be suitable are provided in U.S. Pat. Nos. 6,765,182; 6,717,121; 6,677,563; 6,552,315; 6,455,827; 6,433,322; 6,414,290; 6,251,451; 6,204,492; 6,150,646; 6,114,679; 5,800,724; 5,759,422; 5,672,407; 5,628,921; 5,519,195; 5,424,517; 5,410,135; 5,354,973; 5,340,436; 5,266,386; 5,260,537; 5,221,419; 5,213,902; 5,117,078; 5,039,364; 4,963,424; 4,936,935; 4,890,439; 4,775,771; 4,865,921; and Re. 34,683. Although particular examples of patterns of microwave energy interactive material are shown and described herein, it should be understood that other patterns of microwave energy interactive material are contemplated by the present disclosure.

The microwave energy interactive material may be an electroconductive or semiconductive material, for example, a metal or a metal alloy provided as a metal foil; a vacuum deposited metal or metal alloy; or a metallic ink, an organic ink, an inorganic ink, a metallic paste, an organic paste, an inorganic paste, or any combination thereof. Examples of metals and metal alloys that may be suitable for use with the present invention include, but are not limited to, aluminum, chromium, copper, inconel alloys (nickel-chromium-molybdenum alloy with niobium), iron, magnesium, nickel, stainless steel, tin, titanium, tungsten, and any combination or alloy thereof.

Alternatively, the microwave energy interactive material may comprise a metal oxide. Examples of metal oxides that may be suitable for use with the present invention include, but are not limited to, oxides of aluminum, iron, and tin, used in conjunction with an electrically conductive material where needed. Another example of a metal oxide that may be suitable for use with the present invention is indium tin oxide (ITO). ITO can be used as a microwave energy interactive material to provide a heating effect, a shielding effect, a browning and/or crisping effect, or a combination thereof. For example, to form a susceptor, ITO may be sputtered onto a clear polymer film. The sputtering process typically occurs at a lower temperature than the evaporative deposition process used for metal deposition. ITO has a more uniform crystal structure and, therefore, is clear at most coating thicknesses. Additionally, ITO can be used for either heating or field management effects. ITO also may have fewer defects than metals, thereby making thick coatings of ITO more suitable for field management than thick coatings of metals, such as aluminum.

Alternatively still, the microwave energy interactive material may comprise a suitable electroconductive, semiconductive, or non-conductive artificial dielectric or ferroelectric. Artificial dielectrics comprise conductive, subdivided material in a polymeric or other suitable matrix or binder, and may include flakes of an electroconductive metal, for example, aluminum.

The various blanks and/or constructs contemplated hereby may be formed according to numerous processes known to those in the art, including using adhesive bonding, thermal bonding, ultrasonic bonding, mechanical stitching, or any other suitable process. Any of the various layers that may be used to form the structures and/or constructs of the invention may be provided as a sheet of material, a roll of material, a die cut material in the shape of the construct to be formed (e.g., a blank), or in any other suitable form.

The blank and/or construct may be formed from any suitable dimensionally stable material, for example, coated paperboard or a similar material. For example, the paperboard may have a basis weight of from about 60 to about 330 lbs/ream, for example, from about 80 to about 140 lbs/ream. The paperboard generally may have a thickness of from about 6 to about 30 mils, for example, from about 10 to about 28 mils. In one particular example, the paperboard has a thickness of about 12 mils. Any suitable paperboard may be used, for example, a solid bleached or solid unbleached sulfate board, such as SUS® board, commercially available from Graphic Packaging International.

The blank and/or construct can also be constructed of other materials, such as cardboard, hard paper, or any other material having properties suitable for enabling the package to function at least generally as described above. The blank and/or construct can also be laminated to or coated with one or more sheet-like materials at selected panels or panel sections.

Optionally, one or more portions, panels, or sections of the various blanks and/or constructs described herein or contemplated hereby may be coated with varnish, clay, or other materials, either alone or in combination. The coating may then be printed over with product advertising, graphics, or other information or indicia. The blanks and/or constructs also may be coated to protect any information printed thereon. Furthermore, the blanks and/or constructs may be coated with, for example, a moisture barrier layer, on either or both sides.

Alternatively or additionally, any of the blanks and/or constructs of the present invention may be coated or laminated with other materials to impart other properties, such as absorbency, repellency, opacity, color, printability, stiffness, or cushioning. For example, absorbent susceptors are described in U.S. Provisional Application No. 60/604,637, filed Aug. 25, 2004, and U.S. Patent Application Publication No. US 2006/0049190 A1, published Mar. 9, 2006.

The foregoing description illustrates and describes various embodiments of the disclosure. As various changes could be made in the above construction, it is intended that all matter contained in the above description or shown in the accompanying drawings shall be interpreted as illustrative and not in a limiting sense. Furthermore, various modifications, combinations, and alterations, etc., of the above-described embodiments are within the scope of the disclosure. Additionally, the disclosure shows and describes only selected embodiments, but various other combinations, modifications, and environments are within the scope of the disclosure, commensurate with the above teachings, and/or within the skill or knowledge of the relevant art. Furthermore, certain features and characteristics of each embodiment may be selectively interchanged and applied to other illustrated and non-illustrated embodiments without departing from the scope of the disclosure.

What is claimed is:

1. A microwave packaging material for forming a construct for holding a food item, the microwave packaging material comprising:
   a substrate;
   a film at least partially secured to the substrate by a pattern of adhesive;

a plurality of closed cells extending between the film and the substrate, each closed cell of the plurality of closed cells being at least partially defined by the pattern of adhesive, each of the closed cells being configured to expand during heating of the microwave packaging material to form respective expanded cells; and at least one bonded region extending along at least a portion of the microwave packaging material, the at least one bonded region extending from a closed cell of the plurality of closed cells to an adjacent closed cell of the plurality of closed cells, the film being secured to the substrate along the at least one bonded region, the at least one bonded region being for forming at least one recess among the expanded cells and being for extending along the food item when the microwave packaging material is heated.

2. The microwave packaging material of claim 1, wherein the at least one bonded region has a first characteristic width, the first adhesive has a second characteristic width, and the first characteristic width is greater than the second characteristic width.

3. The microwave packaging material of claim 2, wherein each of the closed cells of the plurality of closed cells has a third characteristic width, and the first characteristic width is generally similar to the third characteristic width relative to the second characteristic width.

4. The microwave packaging material of claim 1, wherein the at least one bonded region has a first characteristic width, each of the closed cells of the plurality of closed cells has a second characteristic width, and the first characteristic width is generally similar to the second characteristic width.

5. The microwave packaging material of claim 1, wherein the pattern of adhesive comprises at least a first adhesive, and the at least one bonded region comprises at least a second adhesive at least partially securing the film to the substrate.

6. The microwave packaging material of claim 5, wherein the first adhesive and the second adhesive are dissimilar to one another.

7. The microwave packaging material of claim 5, wherein the second adhesive of the at least one bonded region comprises a portion of the first adhesive that is an expanded portion of the pattern of adhesive.

8. The microwave packaging material of claim 1, wherein at least a portion of the substrate is secured to a susceptor.

9. The microwave packaging material of claim 8, wherein the susceptor comprises a microwave energy interactive layer and a polymer film.

10. The microwave packaging material of claim 8, wherein the susceptor extends along at least a portion of the plurality of closed cells.

11. The microwave packaging material of claim 1, wherein the film is maintained in at least partial face-to-face contact with the substrate along the at least one bonded region when the microwave packaging material is heated.

12. A construct for holding a food item, the construct comprising:

a microwave packaging material comprising:
  a substrate;
  a film at least partially secured to the substrate by a pattern of adhesive;
  a plurality of closed cells extending between the film and the substrate, each closed cell of the plurality of closed cells being at least partially defined by the pattern of adhesive, each of the closed cells being configured to expand during heating of the microwave packaging material to form respective expanded cells; and at least one bonded region extending along at least a portion of the microwave packaging material, the at least one bonded region extending from a closed cell of the plurality of closed cells to an adjacent closed cell of the plurality of closed cells, the film being secured to the substrate along the at least one bonded region, the at least one bonded region being for forming at least one recess among the expanded cells and being for extending along the food item when the microwave packaging material is heated;

wherein at least a portion of the construct extends at least partially around an interior of the construct for holding the food item.

13. The construct of claim 12, wherein the construct comprises a wrap extending around the interior.

14. The construct of claim 13, wherein the plurality of closed cells of the microwave packaging material comprises a first array of closed cells extending along a first portion of the wrap and a second array extending along a second portion of the wrap, and the at least one bonded region extends along a third portion of the wrap between at least a portion of the first array and the second array.

15. The construct of claim 14, wherein the first portion of the wrap is disposed opposite to the second portion of the wrap.

16. The construct of claim 14, wherein the at least one bonded region is a first bonded region, the plurality of closed cells comprises a third array of closed cells extending along a fourth portion of the wrap, and the microwave packaging material comprises a second bonded region extending along a fifth portion of the wrap between at least a portion of the first array and the third array.

17. The construct of claim 14, wherein the microwave packaging material further comprises a first susceptor area extending on at least the first array of closed cells and a second susceptor area extending on at least the second array of closed cells.

18. The construct of claim 13, wherein the wrap comprises an at least partially open end, and the at least one bonded region extends from the at least partially open end into the interior of the construct.

19. The construct of claim 12, wherein the construct comprises a carton comprising a plurality of panels extending at least partially around the interior of the construct.

20. The construct of claim 19, wherein the plurality of panels comprises a bottom panel, and the microwave packaging material extends along at least a portion of the bottom panel adjacent the interior of the construct.

21. The construct of claim 20, wherein the microwave packaging material is a first microwave packaging material, the plurality of panels comprises a top panel disposed opposite to the bottom panel, and the construct comprises a second microwave packaging material disposed along at least a portion of the top panel.

22. The construct of claim 20, wherein a susceptor extends on at least a portion of the bottom panel.

23. The construct of claim 12, wherein the construct comprises a tray comprising a sidewall extending from a bottom wall and a flange extending generally outwardly from an upper portion of the sidewall, the bottom wall and the sidewall at least partially defining the interior of the construct.

24. The construct of claim 23, wherein the microwave packaging material extends along at least a portion of the bottom wall and the sidewall adjacent the interior of the construct.

25. The construct of claim 23, wherein a susceptor extends along at least a portion of at least one of the bottom wall and the sidewall.

26. The construct of claim 12, wherein the at least one bonded region has a first characteristic width, the first adhesive has a second characteristic width, and the first characteristic width is greater than the second characteristic width.

27. The construct of claim 26, wherein each of the closed cells of the plurality of closed cells has a third characteristic width, and the first characteristic width is generally similar to the third characteristic width relative to the second characteristic width.

28. The construct of claim 12, wherein the at least one bonded region has a first characteristic width, each of the closed cells of the plurality of closed cells has a second characteristic width, and the first characteristic width is generally similar to the second characteristic width.

29. The construct of claim 12, wherein the pattern of adhesive comprises at least a first adhesive, and the at least one bonded region comprises at least a second adhesive at least partially securing the film to the substrate, wherein the first adhesive and the second adhesive are dissimilar to one another.

30. The construct of claim 12, wherein the at least one bonded region comprises an expanded portion of the pattern of adhesive.

31. The construct of claim 12, wherein the film is maintained in at least partial face-to-face contact with the substrate along the at least one bonded region when the microwave packaging material is heated.

32. A method of forming a microwave packaging material, the method comprising:
   at least partially securing a film to a substrate with a pattern of adhesive so that a plurality of closed cells are defined by the pattern of adhesive between the film and the substrate, each of the closed cells being configured to expand during heating of the microwave packaging material to form respective expanded cells; and
   forming at least one bonded region along at least a portion of the microwave packaging material from a closed cell of the plurality of closed cells to an adjacent closed cell of the plurality of closed cells, the forming the at least one bonded region comprising securing the film to the substrate along the at least one bonded region, the at least one bonded region being for forming at least one recess among the expanded cells and being for extending along the food item when the microwave packaging material is heated.

33. The method of claim 32, wherein the at least one bonded region has a first characteristic width, the first adhesive has a second characteristic width, and the first characteristic width is greater than the second characteristic width.

34. The method of claim 32, wherein the at least one bonded region has a first characteristic width, each of the closed cells of the plurality of closed cells has a second characteristic width, and the first characteristic width is generally similar to the second characteristic width.

35. The method of claim 32, wherein the at least partially securing the film to the substrate comprises applying a first adhesive in the pattern of adhesive, and the forming the at least one bonded region comprises at least partially securing the film to the substrate with at least a second adhesive.

36. The method of claim 35, wherein the first adhesive and the second adhesive are dissimilar to one another.

37. The method of claim 32, wherein the at least partially securing the film to the substrate comprises applying an adhesive in the pattern of adhesive, and the forming the at least one bonded region comprises at least partially securing the film to the substrate with at least the adhesive to form an expanded portion of the pattern of adhesive.

38. The method of claim 32, further comprising securing a susceptor to at least a portion of the substrate so that the susceptor extends along at least a portion of the plurality of closed cells.

39. The method of claim 32, wherein the film is maintained in at least partial face-to-face contact with the substrate along the at least one bonded region when the microwave packaging material is heated.

* * * * *